A. E. KEITH.
TELEPHONE EXCHANGE SYSTEM.
APPLICATION FILED MAY 14, 1907.

1,217,121.

Patented Feb. 20, 1917.
10 SHEETS—SHEET 1.

Witnesses:
P. H. Burfiend
A. Anderson

Inventor:
Alexander E. Keith,
By Bulkley Durand
 & Drury
Attorneys.

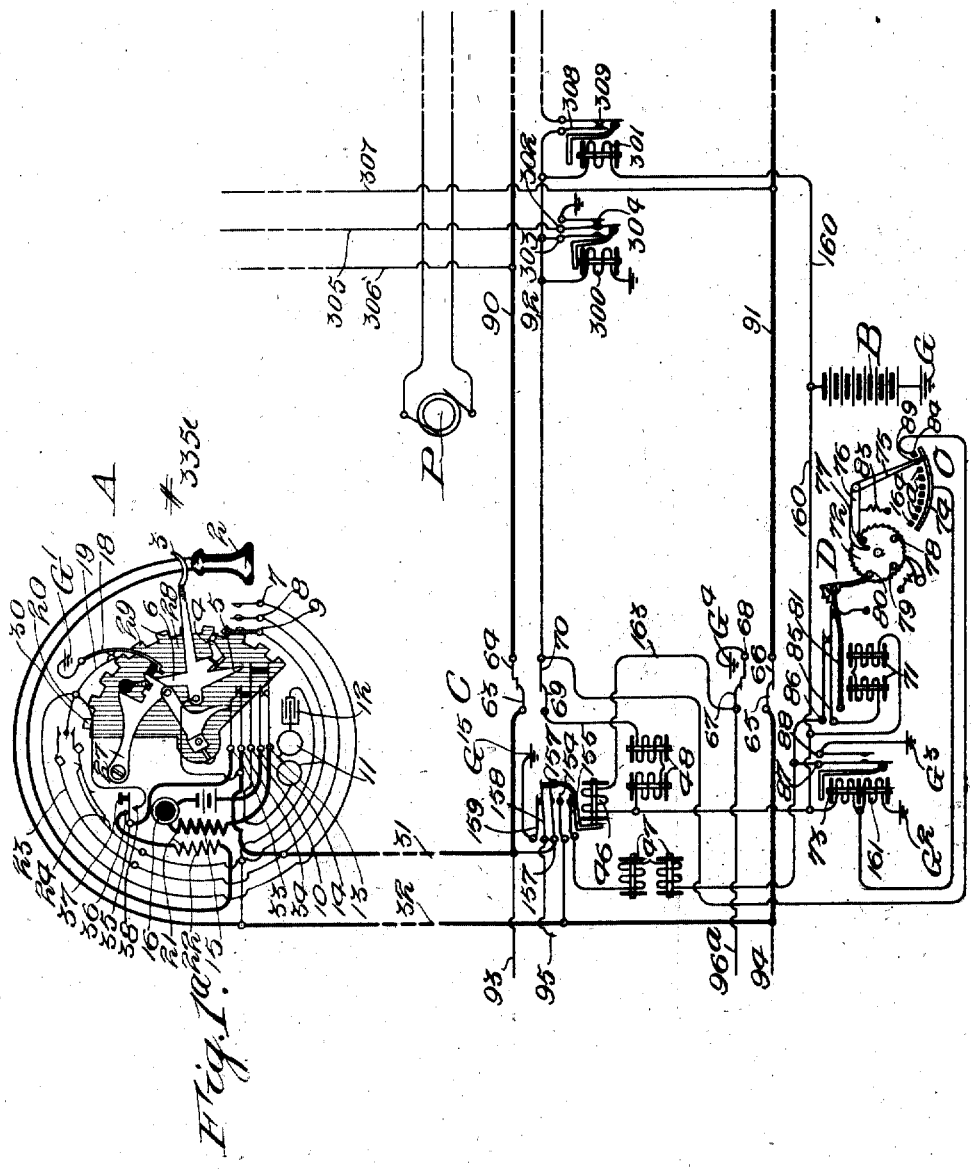

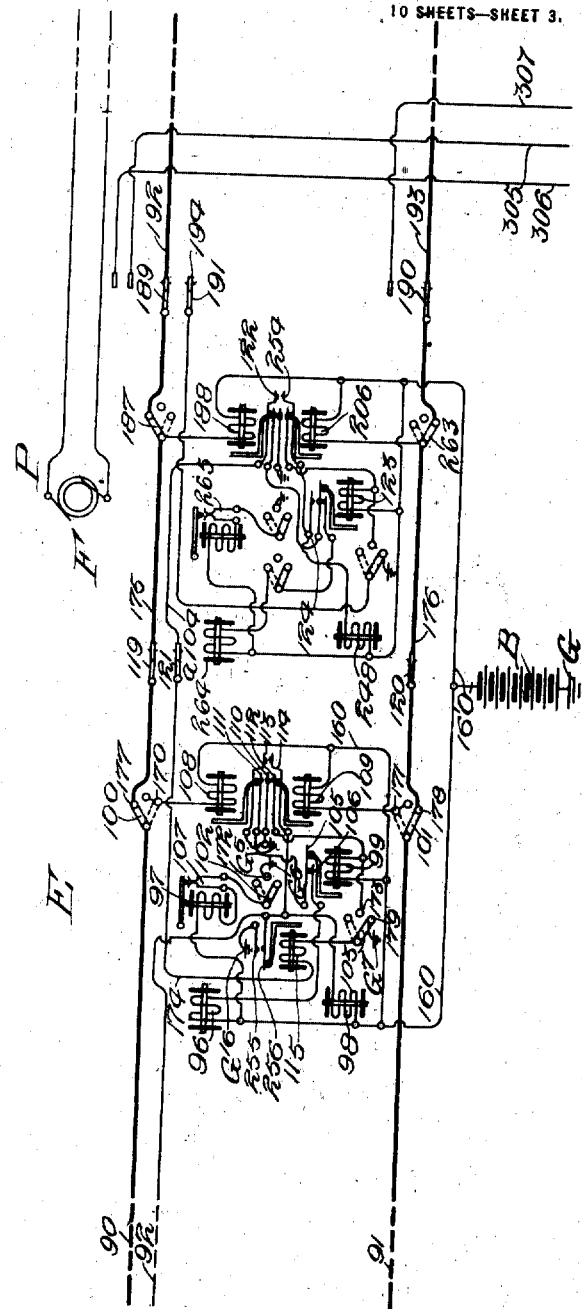

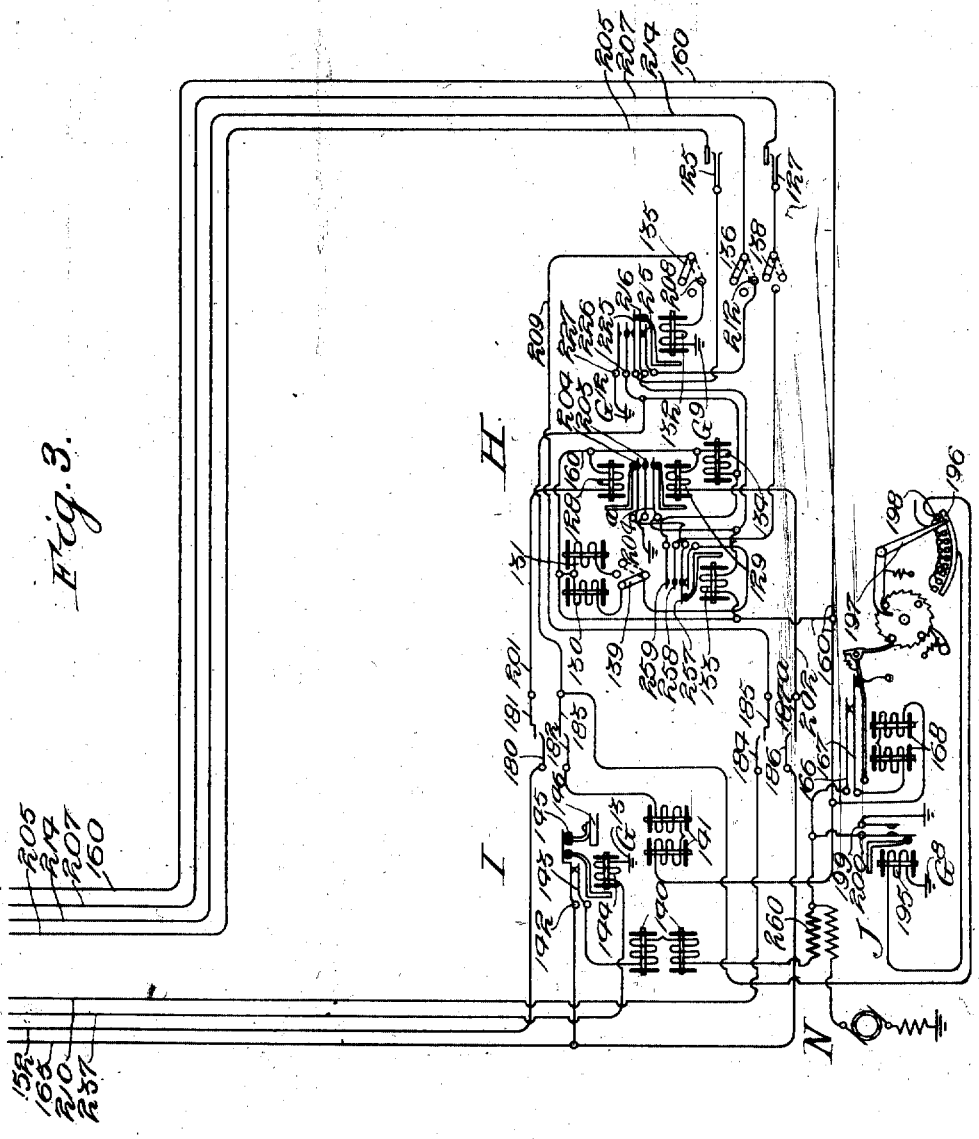

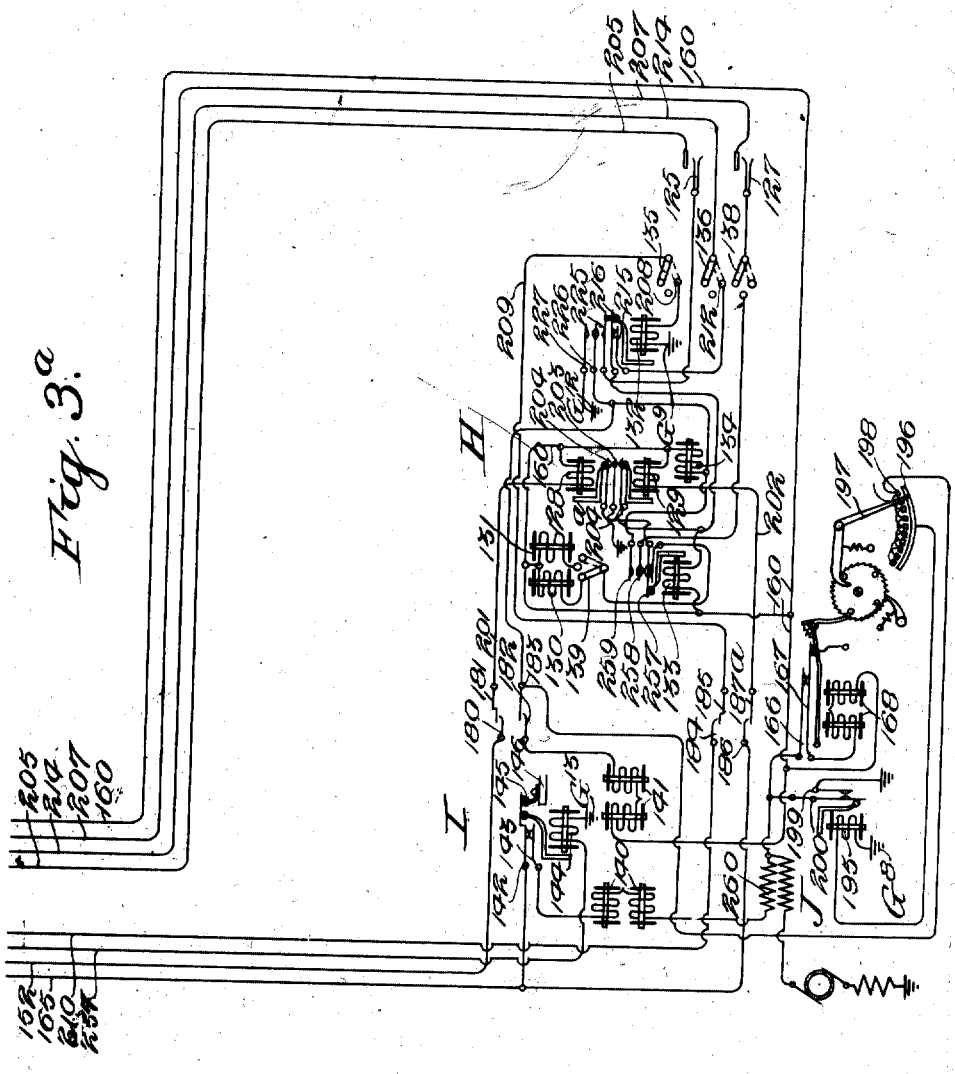

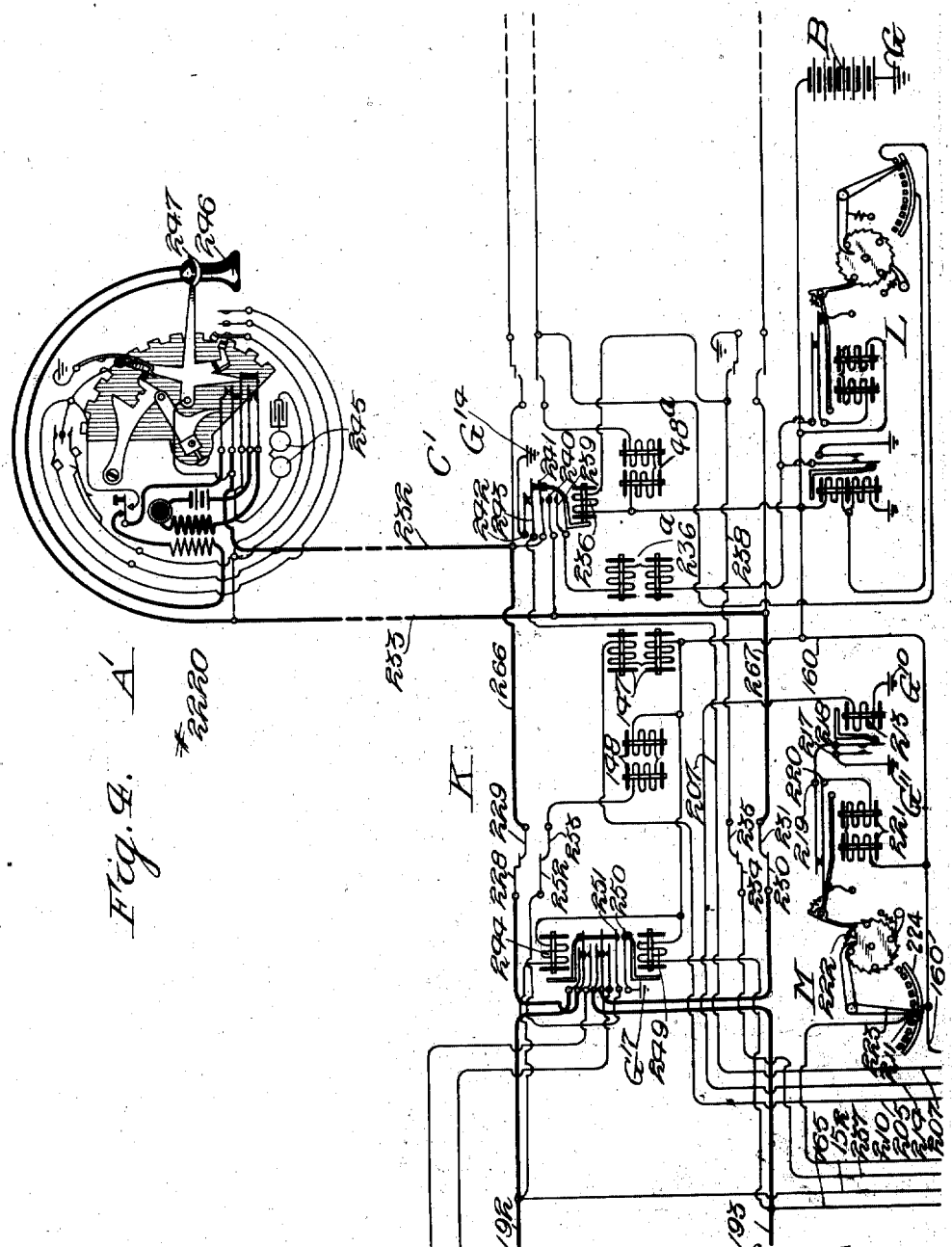

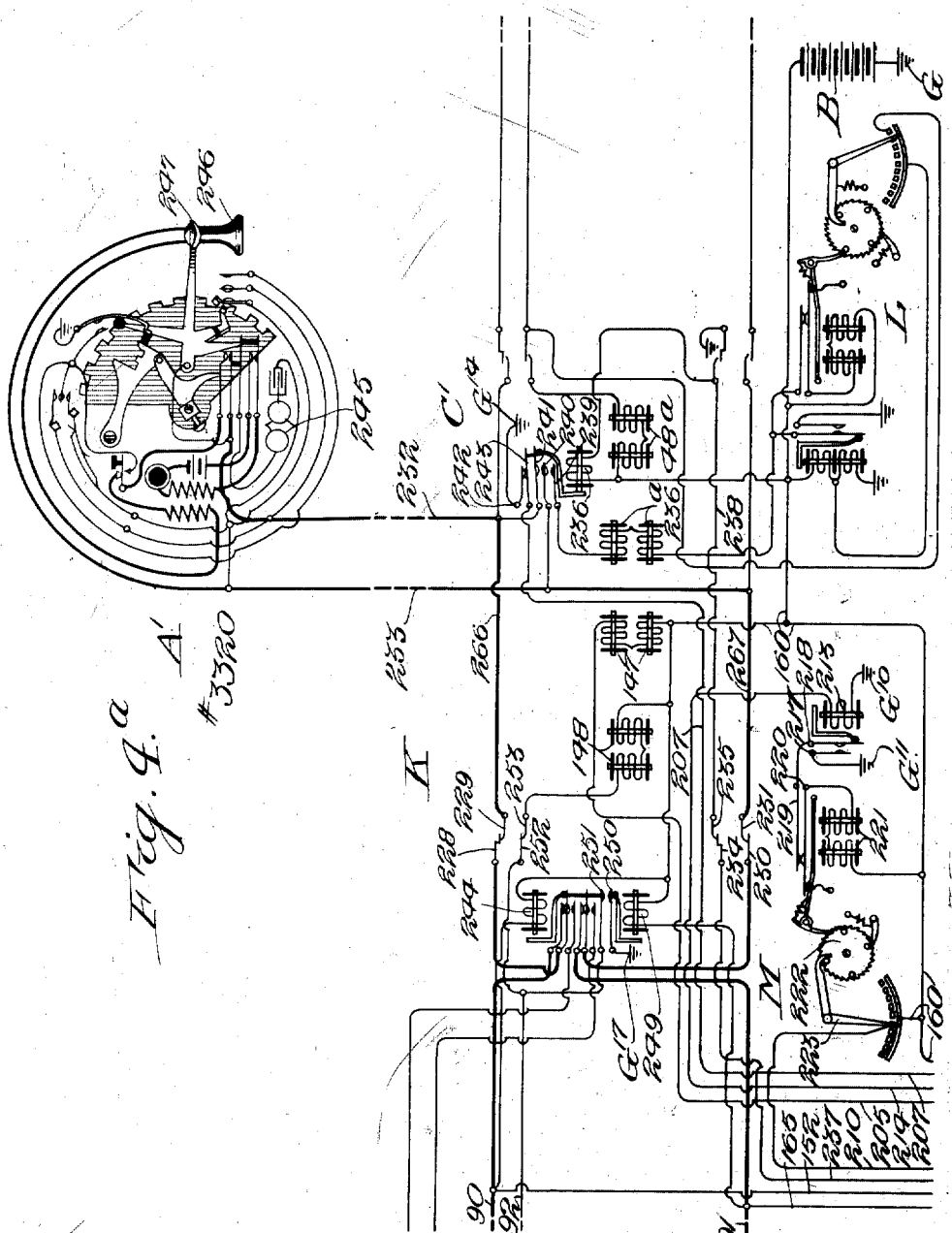

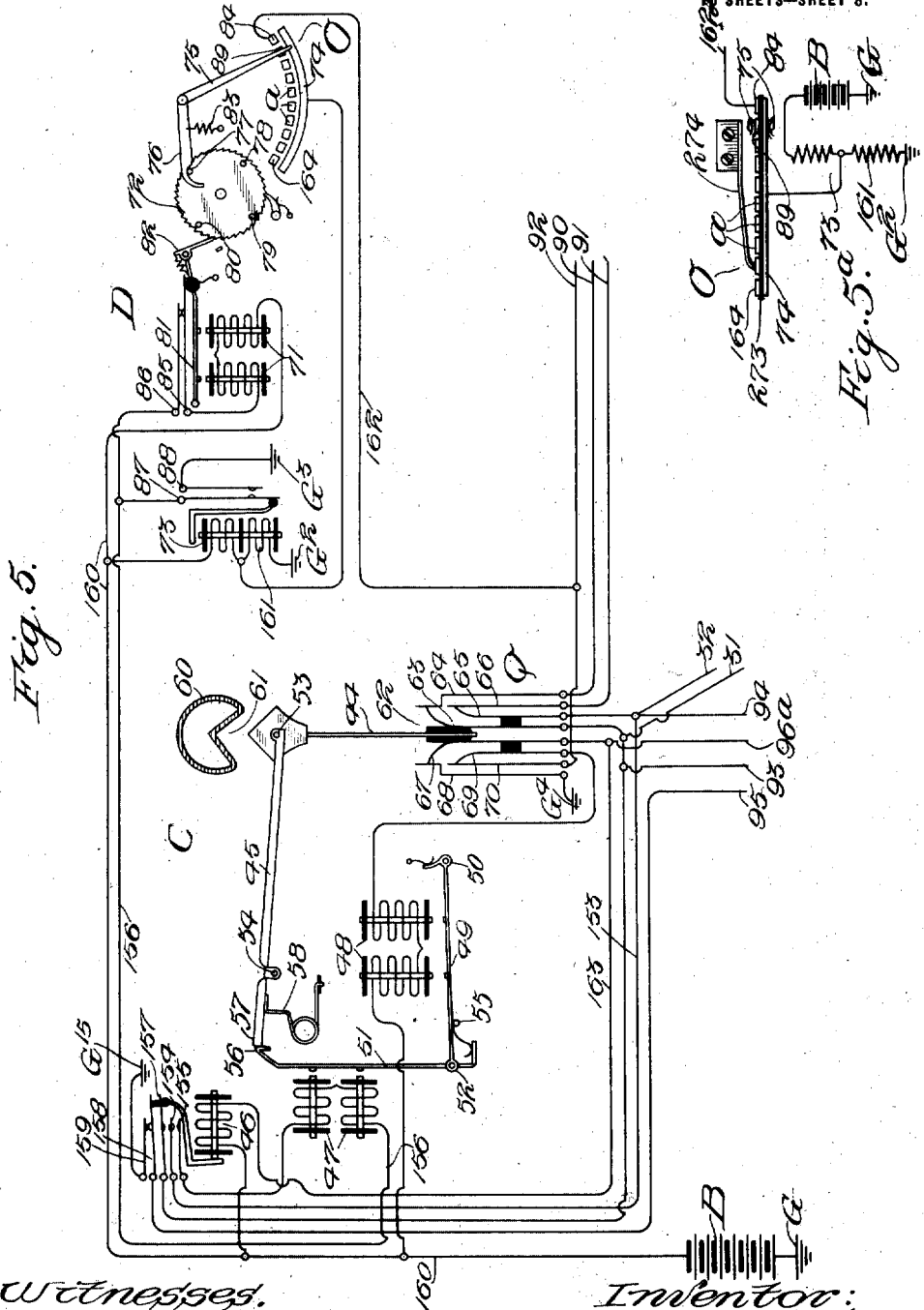

A. E. KEITH.
TELEPHONE EXCHANGE SYSTEM.
APPLICATION FILED MAY 14, 1907.

1,217,121.

Patented Feb. 20, 1917.
10 SHEETS—SHEET 9.

Witnesses:
R. H. Barfield
A. Andersen

Inventor:
Alexander E. Keith,
By Bulkley, Durand & Drury.
Attorneys.

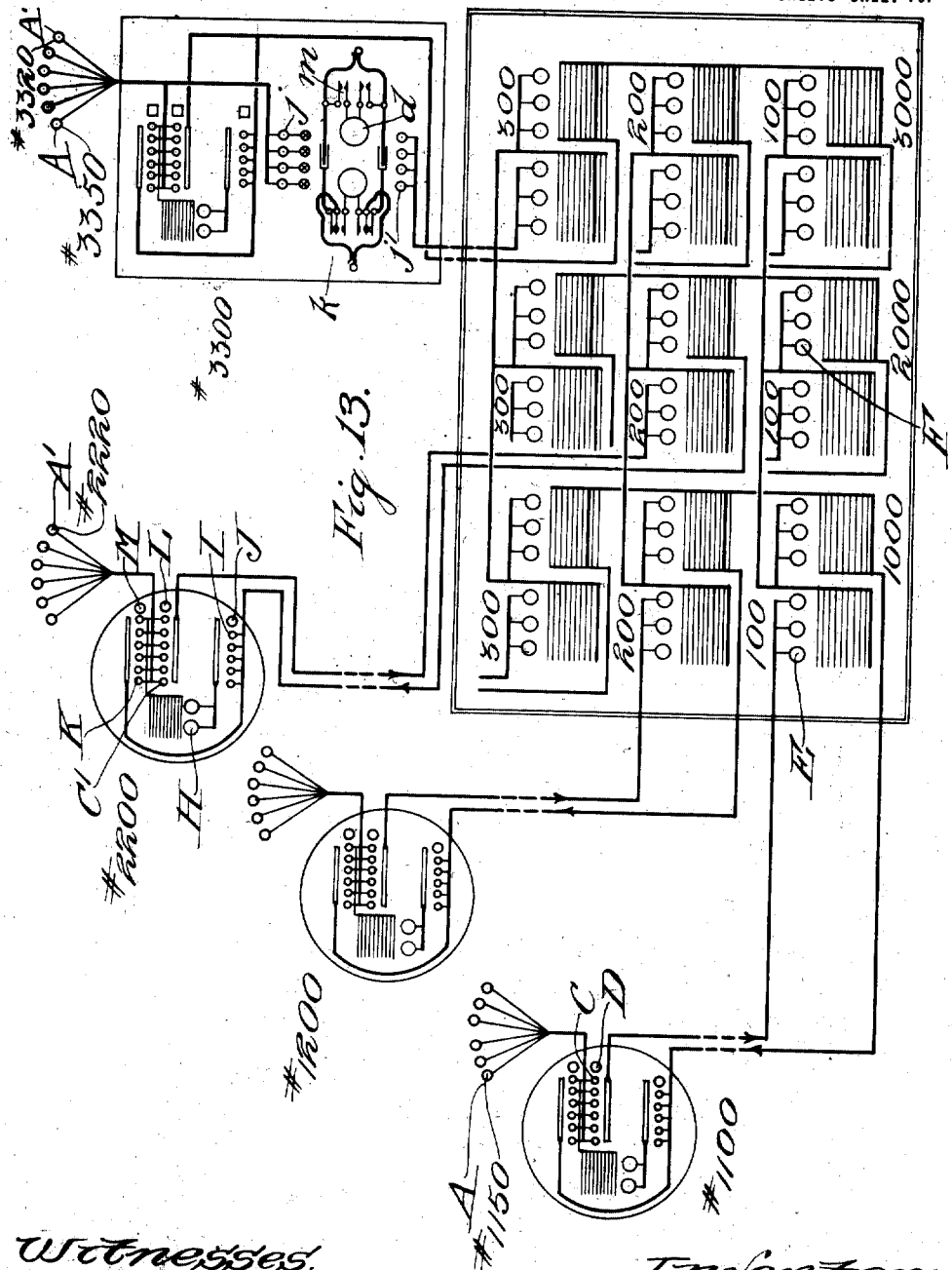

UNITED STATES PATENT OFFICE.

ALEXANDER E. KEITH, OF CHICAGO, ILLINOIS, ASSIGNOR, BY MESNE ASSIGNMENTS, TO AUTOMATIC ELECTRIC COMPANY, OF CHICAGO, ILLINOIS, A CORPORATION OF ILLINOIS.

TELEPHONE-EXCHANGE SYSTEM.

1,217,121.   Specification of Letters Patent.   Patented Feb. 20, 1917.

Application filed May 14, 1907. Serial No. 373,649.

*To all whom it may concern:*

Be it known that I, ALEXANDER E. KEITH, a citizen of the United States of America, and resident of Chicago, Cook county, Illinois, have invented a certain new and useful Improvement in Telephone-Exchange Systems, of which the following is a specification.

My invention relates to telephone systems in general, but more particularly to automatic or semi-automatic telephone exchange systems, and especially to systems in which either all or a portion of the general operation of connecting calling telephone lines with called lines is accomplished automatically—that is to say, by means of selecting or connecting switches controlled from some distant point, as distinguished from ordinary manual switch-boards.

Generally stated the object of my invention is the provision of an improved and highly efficient telephone exchange system.

Special objects are the provision of means whereby the connectors or final numerical switches may be considerably reduced in number, without reducing the efficiency of the service; the provision of a novel arrangement whereby each subscriber is provided with two individual trunking switches, one by which the subscriber calls other subscribers, and another by which the subscriber is called by other subscribers; the provision of a novel and efficient arrangement by which intermediate non-numerical trunk selectors are employed for automatically selecting idle numerical switches, such as connectors or other similar switches; the provision of an arrangement by which, after several switches have been brought into service to extend connection from a calling subscriber's line to a called subscriber's line, one or more of such switches may then be automatically cut out and restored to normal condition, leaving the subscribers' lines connected for conversation; the provision of means whereby, after a plurality of automatic switches have been controlled and brought into service by the calling subscriber for the purpose of extending connection to the called subscriber's line, one or more of said switches may be automatically cut out and restored to normal condition, and a new or substitute connection extended back from the called telephone line in the direction of the calling subscriber, the disrupting or breaking down of the primary or temporary connection being simultaneous or practically simultaneous with the establishment of the new or talking connection; and the provision of certain details and features of improvement and combinations tending to increase the general efficiency and serviceability of a telephone system of this particular character.

To the foregoing and other useful ends, I provide certain features of construction and novel arrangements which constitute a substantial contribution to the general art of telephony, particularly the art of automatic telephony, and which point the way to a new line of development, as will hereinafter more fully appear.

In the accompanying drawings Figure 1 represents diagrammatically a subscriber's substation A and its allotted line switch C, with the master switch D, a battery B having its positive terminal grounded at G, provided for operating the line and master switches.

Fig. 2 shows diagrammatically a first-selector switch E and a second-selector switch F, in connection with which I have elected to explain my invention.

Fig. 3 shows diagrammatically a connector switch H of an improved type, a secondary or trunking line switch I, together with its master switch J.

Fig. 4 shows a called subscriber's substation A' connected with the outgoing line switch C', and also with a second or incoming line switch K of an improved type. The switch C' is controlled by the master switch L, while the master switch M controls the line switch K.

Figure 1:
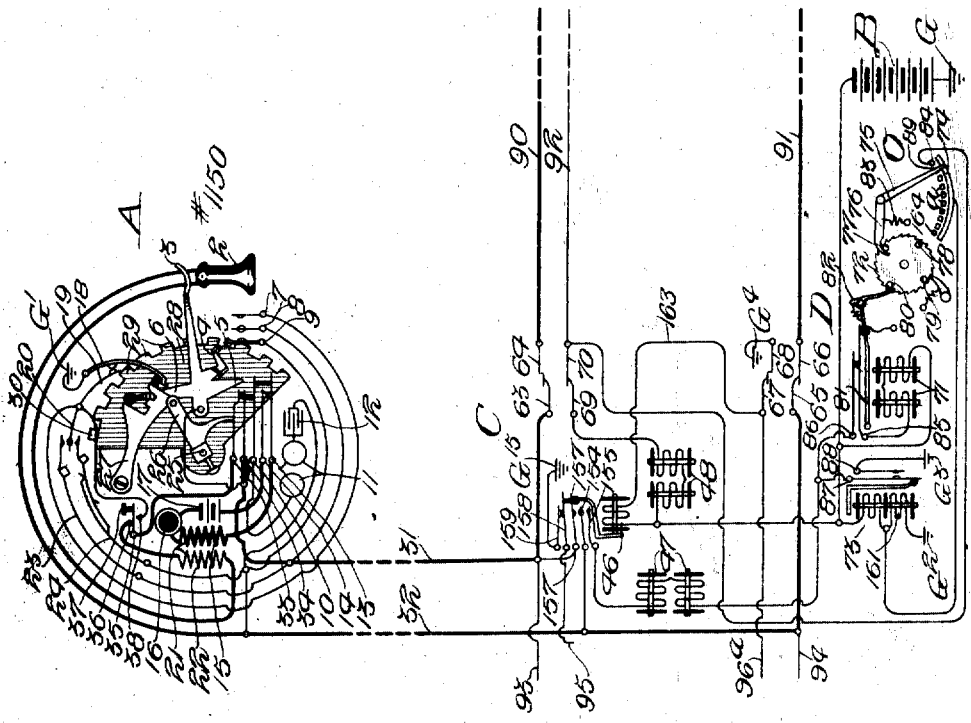
Figure 6:
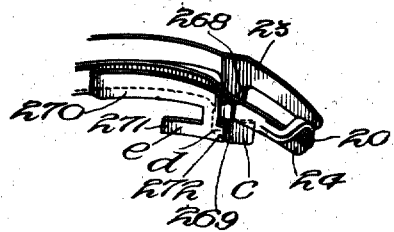

Figs. 1, 2, 3 and 4, taken together, represent diagrammatically the switching apparatus involved in establishing a connection between a subscriber of the sub-central #1100, for example, and a subscriber of the sub-central #2200. The sub-central apparatus is represented in Figs. 1, 3 and 4, while Fig. 2 represents the main central switches.

Figs. 1ª, 3ª and 4ª, taken together, represent diagrammatically the switching apparatus involved when one subscriber of the sub-central #3300 calls another subscriber of the same sub-central. The switching apparatus located at this sub-central corresponds to the switching apparatus located at the other sub-centrals shown in Figs. 1, 3 and 4. Figs. 1ª, 3ª and 4ª correspond to Figs.

3 and 4, respectively, like parts being similarly shown and bearing the same reference numerals.

Fig. 5 is a more complete diagrammatic representation of the line switch C.

Fig. 5ᵃ is a detailed view of the construction of the bank O of the master switch D.

Figs. 6, 7, 8, 9, 10, 11 and 12 are detail views showing the various positions of the impulse springs.

Fig. 13 shows, in a general manner, the relative locations of the different switches employed in the system.

The subscriber of the sub-central #1100 may call and signal any subscriber of the sub-centrals #1200, #2200 and #3300 (Fig. 13) through the medium of the main central exchange. Also, if the subscriber at substation A of the sub-central #1100 desires to call another subscriber of the same sub-central, the connection is extended to the main exchange and then back to the sub-central #1100 to the desired substation. In a similar manner, the subscribers of the sub-centrals #1200 and #2200 may extend connection to other substations, the connection always extending through the main central exchange, even when the calling and called subscribers are members of the same sub-central exchange. But in the sub-central #3300 the arrangement is such that the subscriber may call other subscribers of the same sub-central, without operating the main central switching apparatus—that is, the subscriber at sub-station A of the sub-central #3300 may call and signal the subscriber at substation A' entirely by means of switching apparatus located at the sub-central #3300, while the subscribers at sub-centrals #1100, #1200 and #2200, in calling other subscribers of the same sub-central, operate switching apparatus located in the main exchange and also in the sub-central exchange. Furthermore, the subscribers of sub-centrals #1100, #1200 and #2200 may automatically call any subscriber of the system, but the subscribers at the sub-central #3300, when they desire connection with a line outside of their own sub-central, signal an operator at the #3300 sub-central, and the operator, by means of a calling device, in turn completes the connection with the desired line.

Figure 7:
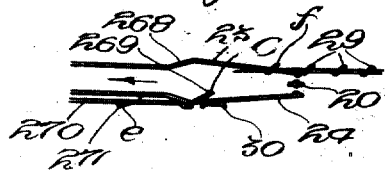
Figure 8:
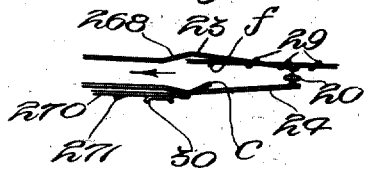
Figure 9:
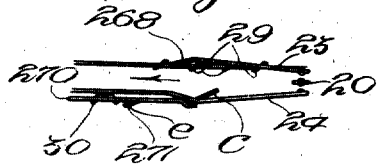
Figure 10:
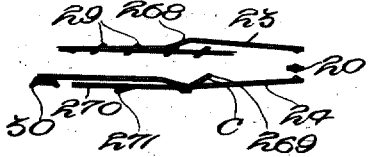
Figure 11:
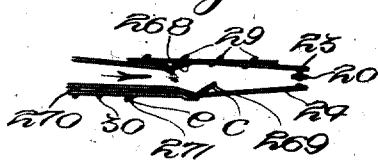
Figure 12:
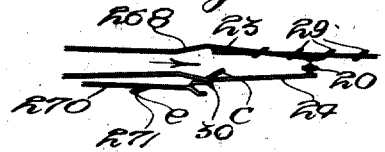

The substations are all alike and may be of any suitable or approved type. The substation A, for example, comprises a receiver 2, a switch-hook for controlling the substation circuits, which controlling operations are accomplished through the medium of any suitable means, such as the cam-arms 4, 5 and 6. As the switch-hook is lowered the cam-arm 4 momentarily presses the release springs 7, 8 and 9 into engagement, whereby the substation line conductors may be grounded simultaneously when the springs 18 and 19 are in contact for the purpose of releasing the switching apparatus at the central office. When the switch-hook is down the cam-arm 5 engages the spring 10, thereby bridging the ringer 11 in series with the condenser 12 across the line. Furthermore, when the switch-hook is down the said cam-arm 5 disengages the springs 13 and 14, thus breaking the local circuit which includes in series the primary winding 15, transmitter 16 and local battery 17. The substation ground circuit is normally broken between the ground springs 18 and 19 by the cam-arm 6; but when the said springs are together ground is provided to the ground post 20, and to the release spring 7, as is usually the case in telephones of this type. The said substation comprises the usual induction-coil 21 having the primary winding 15 and the secondary winding 22. Being an automatic substation it is also provided with the usual and so-called vertical and rotary impulse springs 23 and 24. Said substation is, of course, provided with a dial (not shown) which is secured to the shaft 25, together with the locking dog 26. The substation A, as shown in Fig. 1, is seen from the back, the dial being on the opposite side. Furthermore, there is a locking cam 27 that locks the dog 26 while the receiver is on the switch-hook, to prevent a rotation of the dial. For operating the impulse springs 23 and 24 the substation is provided with an impulse wheel 28 that is secured to the shaft, which impulse wheel carries on its periphery the so-called vertical impulse teeth 29 and one rotary impulse tooth 30. The said impulse teeth are so arranged that when the dial is drawn down the impulse spring 23 is not carried into contact with the ground post 20, while the rotary spring is operated once by the rotary tooth 30 but as the dial returns, one or more of the vertical teeth engage the vertical impulse spring 23 and press it onto the said ground post 20, and after they have completed their work the rotary impulse tooth 30, in a similar manner, again operates the rotary impulse spring 24. In this operation the subscriber's rotary line conductor is first given one preliminary ground impulse and then the vertical line conductor 31 is given a number of ground impulses, after which the rotary line conductor 32 is given one more ground impulse. It will be noticed that as long as the dial is out of normal position the construction is such that the dog 26 permits the secondary circuit springs 33 and 34 to separate, thus preventing the impulses that are delivered to either line conductor from passing to the other. The vertical impulse spring 23 is provided with an oblique projection or lug 268 (see Figs. 6 to 12, inclusive), on the under side of which the vertical impulse teeth 29 are adapted to engage for driving the spring 23 intermittently onto the ground post 20. The rotary impulse spring 24 is provided with somewhat similar mechanism for driving the said rotary spring onto the ground post, once when the dial is rotated in one direction, and once when rotated in the opposite direction. The said rotary impulse spring 24 has on its under side a V-shaped member 269 having two sides $c$ and $d$, and there is in addition an auxiliary spring 270 which works in conjunction with the said V-shaped member. As shown more clearly in Fig. 6 the auxiliary spring 270 is provided with a lower curved part $e$ having the rear section 271 curving outwardly, as shown also in Figs. 7, 8, 9, 10, 11 and 12. The front section 272 of said member $e$ is designed to fall just below the apex of the V-shaped member 269, so that the rotary impulse tooth 30, when moved in the direction of the arrow (Fig. 7), will pass onto the curved member $e$, thus pressing the rotary impulse spring 24 onto the ground post 20 for a comparatively long time, as shown in Fig. 8, and thus sending to the line a comparatively long impulse. As the impulse wheel advances, the vertical impulse teeth 29 approach the lug 268 of the vertical impulse spring 23 (Fig. 8), and eventually the first tooth $f$ that meets the lug 268 clears the said lug, as shown in Fig. 9, but not until after the rotary impulse tooth 30 clears or disengages the curved member $e$. As the impulse wheel continues to advance in the direction of the arrow (Fig. 9), succeeding impulse teeth 29 will clear the projection 268, as shown in Fig. 10. Then when the impulse wheel is released, first the vertical impulse spring 23, which cleared the vertical impulse teeth previously cleared, is carried into engagement with the ground post 20, as indicated in Fig. 11; and as the impulse wheel nears its normal position the rotary impulse tooth 30 passes under the curved member $e$ of the auxiliary spring 270 (Fig. 12), engaging the V-shaped member 269 directly, but for a short time only, sending the ordinary impulse, through the medium of the rotary impulse spring 24, to the line conductor 32, after which the said member 269 is cleared, as shown in Fig. 7, as the impulse wheel reaches its normal position. The operations, as thus described, are repeated each time that the dial is operated, and the number of impulses produced through the medium of the vertical impulse spring 23 are accurately and definitely determined at each operation of the dial by the finger-hole which the subscriber previously selects on the dial. Means whereby the subscriber may signal the called subscriber comprises the push-button spring 35 which normally engages the contact point 36; but when the button 37 is pressed the spring 35 engages the contact point 38, whereby the vertical line conductor 31 may be grounded.

Such a substation is described in United States Patent application of John Erickson, Serial No. 343,043, filed December 21, 1906. The substation is also provided with a governor (not shown) for controlling the speed of the impulse wheel 28 and the switch-hook 3. The individual or line switch C (Fig. 5) is of the same general form disclosed in my prior United States Patent application, Serial No. 311,327, filed April 12, 1906.

The said switch C comprises, as shown in Fig. 5, a plunger 44, plunger arm 45, bridge-cut-off relay 46, trip magnet 47 and switch-release magnet 48, all of which are built about a switch-base or frame (not shown) of any suitable or approved design. The said switch-release magnet is provided with an armature 49 that is pivoted on a pin 50 which rises from the base of the switch. The said armature carries pivotally secured on its end a second armature 51 that is controlled by the trip magnet 47. The pin 52 about which the armature 51 oscillates is carried on the end of the armature 49. The plunger 44 is pivotally secured by the pin 53 to the plunger arm 45, which latter is in turn pivoted to a pin 54 that rises from the switch-frame. The lug 55 is stamped out of the side of the frame and is provided as a stop or rest for the armature 49. Upon the armature 51 is secured the catch spring 56 which is adapted to engage the end 57 of the plunger arm 45. Furthermore, the said line switch is provided with a bank of terminals, usually ten in number, only one of which is shown at Q (Fig. 5). As shown, the said terminal Q is, for convenience of illustration, rotated from its true position with respect to the swing of the plunger 44, and the bushing 62 is correspondingly arranged, all for the purpose of making the illustration clearer. The terminal Q comprises the springs 63 and 64, 65 and 66, 67 and 68, and 69 and 70 which are normally disconnected from each other, but which are driven into contact in the above-mentioned order when the plunger 44 operates. Normally the idle plunger 44 rests in the trough 61 of the plunger shaft 60.

The general operation of the switch is as follows: The trip magnet 47 is energized by a preliminary impulse, and the armature 51 is attracted against the magnet cores. When the armature 51 is attracted the catch 56 slides out of contact with the end 57 of the plunger arm 45, and the said plunger arm 45, owing to the tension of the spring 58, moves about the pin 54 and thrusts the plunger 44 into the bank terminal Q (shown in Fig. 5); and when the trip magnet again deënergizes, the trip armature 51 falls against the end of the plunger arm 45. The switch is restored when the release magnet 48 becomes energized, whereby the armature 49 is attracted, and accordingly the trip armature 51 is moved upwardly until the catch 56 slides over the end 57; then when the release magnet 48 becomes deënergized the armature 49 returns to normal position and remains at rest against the stop 55. Furthermore, since the plunger arm 45 is now in engagement with the armature 51, the said plunger arm is also moved about the pin 54, whereby the plunger 44 is moved from the terminal Q and falls back into the trough 61 of the plunger shaft; and as the said plunger shaft is advanced each time an idle trunk line is seized, the idle plungers are then advanced to point opposite the next idle trunk line. From this on the plunger 44 is carried along by the shaft 60 until it is again released when another call is made.

The master switch D, which may be of any suitable or approved type, is provided for operating the plunger shaft 60, and for controlling certain circuits that will be disclosed hereinafter. It comprises the following details: A motor magnet 71 for operating the ratchet wheel 72, which latter is designed for operating the plunger shaft 60, and a differential relay 73 for controlling the energizing circuit of the motor magnet 71. The said master switch also has a bank O comprising a plurality of individual contact segments $a$ and a common metallic segment 74, as shown in Fig. 5. The wiper 75 is adapted to remain in constant engagement with the bank O, and to maintain some one of the segments $a$ in electrical connection with the common segment 74. The wiper 75 is operated in a step-by-step manner by the ratchet wheel 72 through the medium of a cam member 76 rigidly secured to the said wiper 75 and adapted to successively engage the pins 77, 78, 79 and 80 upon the said ratchet wheel 72. The motor magnet 71 is provided with an armature 81 upon the end of which there is suitably secured a pawl 82. Each time that the said magnet is energized the pawl 82 engages the ratchet wheel 72, advancing the latter one step. It will be noticed, therefore, that as the ratchet wheel 72 advances in a counter-clockwise direction the wiper 75 advances step by step from right to left, and when the pin 77, for instance, clears the cam 76 the retracting spring 83 restores the wiper 75 to its first position at the right of the bank O, and in engagement with the first segment 84. The said motor magnet 71 is provided with a couple of interrupter springs 85 and 86 that are included in the energizing circuit of the said motor magnet, which energizing circuit also comprises the springs 87 and 88 controlled by the differential relay 73. Therefore, whenever the differential relay 73 is energized the springs 87 and 88 are pressed into contact and the motor magnet 71 operates step by step as long as the differential relay 73 remains energized. Also, it is assumed that the terminal Q of the line switch C is the first terminal of the line switch bank. The plunger 44, while in normal locked engagement with the shaft 60, is retained in front of said terminal by the plunger shaft 60 whenever the master switch wiper 75 is in engagement with the bank segment 84; but as the motor magnet 71 advances the wiper 75 onto the second segment 89, the said plunger and all idle plungers similarly engaging the shaft 60 are carried opposite the next terminal of the line switch bank. The master switch bank O (Fig. 5$^a$) comprises the individual segments $a$ separated from the common segment 74 by the insulating strip 273. It will be noticed that after the wiper 75 passes over the segments from right to left and engages the last segment 164, then on the next step the wiper 75 passes from the extreme left contact 164 to the contact 84 on the extreme right; but in passing from one extreme position to the other the upper part of the wiper 75 slides onto the insulated member 274. This provision is made in order that the individual segments $a$ may not be brought into contact with the common segments, whereby some interference with the successful operation of the master switch might be experienced. It should be noted that in each switch bank all of the springs 63 are permanently connected and may be made of one common piece; the springs 64, however, are individual—that is, there is one separate and distinct spring for every terminal Q, there being ten in the bank. The springs 65, 67, 68 and 69, like the springs 63, are also common, and the springs 66 and 70, like the springs 64, are individual. For every bank terminal Q there is a trunk line of three conductors 90, 91 and 92 leading to a second-selector; and there is also a normal trunk line comprising the conductors 93, 94 and 96$^a$ leading to the incoming line switch and a conductor 95 leading to the connector switch banks. The subscriber's line conductors 31 and 32 terminate in the springs 63 and 65 which, as has been stated, are common springs. When the subscriber operates the line switch C and the plunger 44 engages the terminal Q, the subscriber's line conductors 31 and 32 are extended to the vertical and rotary trunk conductors 90 and 91 and thence to the switch E.

The selector E, shown in Fig. 2, is a modified form of the selector switch disclosed in United States Letters Patent No. 815,321, granted March 13, 1906, to Keith, Erickson and Erickson. It is provided with a vertical magnet 96 and a rotary magnet 97, a release magnet 98 and a private magnet 99. The said private magnet 99, of course, controls the side switch wipers 100, 101, 102 and 103, the said private magnet also controlling the circuit of the vertical magnet 96 in the usual manner by means of the spring 105 and 106, but not the circuit of the release magnet, for the release magnet spring is omitted. The vertical movement of the switch shaft and, therefore, of the wipers 119, 120 and 121 is controlled by the vertical magnet 96, and the rotary movement by the rotary magnet 97, the rotary magnet circuit being provided with the usual interrupter springs 107. The operating magnets of the switch are, of course, controlled by the subscriber through the use of the vertical and rotary line relays 108 and 109, as is well known. Said relays have under their control the usual springs 110, 111 and 112 and in addition the trunk-release springs 113 and 114, whereby the said switch may be released when the side switch wipers are in first or second position. By means of the back-release relay 115 the release of the switch E is brought about after the side switch has passed to third position.

Each selector switch in this system is provided with line and private banks. The contacts of each line bank are adapted to be engaged by corresponding line wipers, such as the wipers 119 and 120, and the contacts of each private bank by a corresponding private wiper, such as the wiper 121.

The selector F is also a modified form of the selector of the said selector patent. It is of the bridging type, in which the line relays 188 and 206 are permanently connected to the side switch wipers 187 and 263. It is also provided with the vertical magnet 264ª and the rotary magnet 265, the release magnet 248 and the private magnet 123. The line relays 188 and 206, as shown, control the so-called trunk-release springs 122 and 254, the former being connected with the trunk-release conductor 104, and the latter with the release magnet 248. The private magnet 123 of the switch F, unlike the selector E, is provided with the usual spring 124 that is connected with the release magnet 248.

The connector switch H may also be of any suitable or approved type, and, as shown, is a modified form of the connector described in United States Letters Patent No. 815,176, granted March 13, 1906, to Keith, Erickson and Erickson. The connector switch shaft (not shown), like the first-selector switch shaft, carries the wipers 125 and 127. The connector switch is also controlled by the calling subscriber through the medium of the vertical and rotary line relays 128 and 129. The vertical line relay 128 directly controls the vertical magnet 130 and also the rotary magnet 131. The office of the vertical magnet 130 is to give the shaft and shaft wipers their vertical motion, and the rotary magnet 131 imparts to the shaft and shaft wipers a rotary or circular motion. The rotary line relay 129 controls the private magnet 133 which, under certain conditions, in turn controls the vertical and rotary magnets 130 and 131, release magnet 134, and also the side switch wipers 135, 136, 138 and 139. The side switch of the connector, like the side switch of the first-selector, has a normal or first position, a second position and a third position. The release magnet 134 is also controlled by a special release relay 132. The central office is equipped with busy-signaling apparatus of any suitable design comprising an interrupter in series with the primary winding of an induction-coil as shown at N, whereby a busy-signaling current is induced in the secondary winding 260 of the said coil.

The line switch I (Fig. 3) is a modification of the line switch C (Fig. 1), and is bridged across the trunk conductors 192 and 193. Like the switch C it is equipped with the trip magnet 140 for operating the plunger arm 146, as explained in connection with the line switch C. Also, the usual release magnet 141 provides the means for restoring the switch to normal position. In this switch the cut-off relay 144 is provided with only two springs, namely 142 and 143, which are arranged so that when the trip magnet energizes and permits the plunger to seize an idle trunk, the bushing 145 on the end of the plunger arm 146 then carries the spring 142 out of engagement with the spring 143, thus breaking the circuit of the trip magnet 140. The plunger arm 146 is similar to the plunger arm 45 of the line switch C (Fig. 5), and in addition to the arrangement shown in Fig. 5 the bushing 145 is provided for operating the springs 142 and 143, as explained. The line switch K which is the terminal of the trunk line, the conductors 192 and 193 of which line are shown, is a modification of the switch C, and comprises the usual trip magnet 147 and the release magnet 148, but the bridge-cut-off relay is omitted. Both of the line switches K and C' being allotted to the line of substation A', the switch K may be termed the incoming switch and the switch C' the outgoing switch, since when the substation A' is called the line switch K is employed in establishing the connection, and when the subscriber at substation A' calls another substation the line switch C' is brought into service. It will be understood, of course, that the substation A (Fig. 1) is provided with a switch similar to the switch K, in which switch the normal conductors 93, 94 and 96ª terminate, exactly as the conductors 266, 267 and 238 of the switch C' (Fig. 4) terminate in the switch K. It will also be evident that the conductor 95 of the switch C (Figs. 1 and 5) terminates in a connector bank, exactly as the conductor 207 of the switch C' terminates in the bank of the connector H (Fig. 3).

A clearer understanding of the operation of my improved system may be obtained by considering its operation when one subscriber calls another. Assume, for example, that the subscriber at substation A desires to call the subscriber at substation A' to which is allotted the line #2220. To call the number 2220 the subscriber at substation A raises his receiver from the switch-hook and operates the calling device once, in the well-known manner, for each digit. When the dial is rotated for the first digit a preliminary impulse is transmitted over the rotary line conductor. This preliminary impulse energizes the trip magnet 47, whereby the line switch is operated to seize an idle trunk line leading to a first-selector. The dial in returning to normal position for the first digit operates the first-selector switch to establish connection with an idle trunk line leading to a second-selector. The second-selector F, in a similar manner, operates in accordance with the second digit to select an idle trunk line leading to a secondary line switch. When the dial is rotated for the third digit this secondary line switch receives a preliminary impulse and is "tripped-in" or operated to seize an idle trunk line leading to a connector switch H, in the same manner in which the first line switch C is operated to seize a first-selector switch. It will be understood, of course, that when the dial is turned for each digit a preliminary rotary impulse is transmitted to the rotary line, which impulse, if a selector E or F or a connector H is on the line, is received by the rotary line relay of the switch while the side switch is in first position. This rotary line relay, of course, energizes; but since the side switch is locked in first position until the shaft is raised, is without effect, and the switch is not operated until the dial delivers the vertical impulses. Said preliminary impulse is effective only in operating the line switches. The impulses for the last two digits are directed toward the connector H which operates to place its shaft wipers in connection with the contacts corresponding to the desired line, and when this connection is made the master switch M is operated to carry the plungers of all idle switches K opposite the trunk line leading to the particular line switch I previously selected by the selector F. When the plungers are carried to this position the line switch K is tripped into connection with the trunk line conductors 192 and 193, and the connector H automatically released, whereby the conductors from the second-selector are extended directly through the line switch K to the called substation. From this it will be evident that the connector switch H merely serves to operate the line switch K, so that the conductors from the second-selector are extended to the calling substation directly through the line switch K, and not through a connector. The preliminary impulse for operating the line switch C, which occurs when the calling subscriber rotates the dial in a forward direction for the first digit, is caused by the rotary impulse spring 24 being pressed against the ground post 20. As a result of the impulse the trip magnet 47 of the line switch C is energized by a flow of current from ground G' to the springs 18 and 19, ground post 20, impulse spring 24 to the rotary line conductor 32, conductor 153, cut-off relay springs 154 and 155 to the trip magnet 47, thence through said trip magnet to the conductor 156, springs 86 and 85, through the winding of the motor magnet 71 to the battery lead 160, thence through battery B to ground G. Although this circuit includes the motor magnet 71 this magnet 71 does not operatively energize, since the magnet 47 is of much higher resistance than the magnet 71. As soon as the trip magnet 47 energizes, the armature 51 is attracted and the plunger 44 is liberated and thrust into the bank terminal Q by the spring 58, assuming that the plunger 44 is opposite the terminal Q at the time. When the plunger 44 engages the bank terminal Q an energizing circuit is closed through the motor magnet relay 73, which in turn operates to close an energizing circuit through the motor magnet 71. The motor magnet then operates to advance all idle plungers which are in engagement with the shaft 60 opposite the next idle bank terminal similar to the terminal Q. The circuit through the relay 73 extends from ground $G^2$ through the winding 161 of the relay 73, segment 74, wiper arm 75, segment 84, conductor 162, bank terminal springs 70 and 69, release magnet 48 to the battery lead 160, thence through battery B to ground G. Although this circuit includes the release magnet 48 the magnet 48 does not operatively energize, since the windings of the relay 73 are of a high resistance, while the winding of the release magnet is comparatively low. The relay 73 upon energizing operates to place the springs 87 and 88 in contact, whereby a circuit is completed through the motor magnet 71 extending from ground $G^3$ through the springs 88 and 87, motor magnet springs 86 and 85, through the motor magnet 71 to the battery lead 160, thence through battery B to ground G. The motor magnet 71 upon energizing attracts its armature 81, whereby the pawl 82 engages the ratchet wheel 72 and rotates the wheel one step. When the armature 81 is attracted against the magnet cores the springs 85 and 86 disengage, thereby breaking the energizing circuit through the motor magnet. The cam 76 being in engagement with the pin 77 is operated to advance the plunger shaft 60, and consequently all idle plungers that may be in normal condition with the shaft 60, one step and to a point opposite another trunk terminal similar to the terminal Q, assuming the next succeeding trunk is idle. Consequently, the wiper 75 is carried from the contact point 84, which corresponds to the terminal Q, to the contact point 89, which latter corresponds to the terminal before which the advanced idle plungers are now resting. Suppose that nine subscribers have called, and that the master switch has been thus operated nine steps, carrying the wiper 75 to the last contact point 164. Now, when the motor magnet 71 operates for the last step, when the tenth subscriber calls, the wiper 75 moves back and drops into engagement with the contact point 84, as already explained. If the first trunk is still busy the wiper 75 finds a potential on the contact 84, and an energizing circuit is established through the differential relay 73, which in turn operates to close an energizing circuit through the motor magnet 71. The current through the said relay 73 flows from the said contract 84 through the wiper 75 to the common segment 74, through the winding 161 of the differential relay 73 to ground $G^2$. When the differential relay 73 attracts its armature the differential relay springs 87 and 88 are pressed into contact, thereby closing an energizing circuit for the motor magnet 71 from ground $G^3$ through the said springs 88 and 87, through the motor magnet springs 86 and 85, motor magnet 71, thence to the battery lead 160, and through battery B to ground G. The motor magnet then operates, as previously explained, to rotate the ratchet wheel 72 one step for advancing the plunger shaft 60 one step, and the master switch bank wiper 75 one step also, and into engagement with the second segment 89. The plunger shaft 60, when thus advanced one step, carries all idle plungers that are in engagement with the said shaft opposite the next bank terminal, as previously explained. If there should still be a guarding potential at the bank segment 89 of the master switch bank the differential relay 73 will remain energized, whereby the energizing circuit through the motor magnet 71 is again completed, when the motor magnet springs 85 and 86 again engage; and as a result the motor magnet 71 is again operated, whereby the plunger shaft 60 and the master switch wiper 75 are advanced another step. This process continues as long as the wiper 75 continues to find segments with guarding potentials. As soon as an idle segment is found, however, the energizing circuit through the differential relay 73 is broken, at which time the said relay in turn breaks the energizing circuit for the motor magnet 71, until the next subscriber makes a call.

At the instant that the plunger 44 enters the said bank terminal Q the following springs are pressed into contact: 63 and 64, 65 and 66, 67 and 68, and 69 and 70. The engagement of the springs 67 and 68 closes a circuit through the cut-off relay 46 extending from ground $G^4$ through the springs 68 and 67, conductor 163, relay 46 to the battery lead 160, thence through battery B to ground G. The said relay upon energizing breaks the contact between the springs 154, 155 and 157, whereby the vertical and rotary line conductors 31 and 32 become disconnected from the trip magnet 47. The cut-off relay upon energizing places the springs 158 and 159 in contact, thereby establishing a guarding potential by way of the normal conductor 95 to the connector private bank contacts corresponding to the line that terminates in the line switch C, to prevent any subscriber from calling the said line after the calling subscriber at substation A operates his dial preparatory to making a call, as explained. The circuit over which the said guarding potential is established extends from ground $G^{15}$ through the springs 159 and 158 to the private normal conductor 95. Also, the closure of connection between the springs 69 and 70 establishes a guarding potential at the master switch bank contact 84 over the following circuit: from battery B to the battery lead 160, through the release magnet 48 and springs 69 and 70 over the conductor 162 to the said contact point 84. It will be understood that the bank terminal Q, being the first bank terminal of the line switch bank, corresponds to the first segment 84 of the master switch bank O and, therefore, to the trunk line, the conductors 90, 91 and 92 of which terminate in the selector E. This guarding potential protects the seized trunk conductors 90, 91 and 92 from being seized by other plungers, as already explained. The closure of connection between the springs 63 and 64 extends the calling subscriber's vertical line conductor 31 to the vertical trunk conductor 90 and to the side switch wiper 100 of the first-selector E. The closure of contact between the springs 65 and 66 in a similar manner extends the subscriber's rotary line conductor 32 to the rotary trunk conductor 91 and to the side switch wiper 101 of the selector E. The subscriber has thus established connection with the selector E which is now operated by the impulses that are sent in as the dial returns. The first digit being 2 the spring 23 is pressed onto the ground post 20 twice. As a result the vertical line relay 108 of the first-selector E is energized each time by a flow of current from the substation ground $G'$ through the springs 18 and 19 to the ground post 20, thence through the spring 23 to the vertical line conductor 31, line switch bank springs 63 and 64, vertical trunk conductor 90, side switch wiper 100 of the selector E, contact point 170, vertical line relay 108 to the battery lead 160, thence through battery B and to ground G. Each time that the vertical line relay 108 energizes, the line relay spring 111 is pressed onto the ground spring 110. The vertical magnet 96 is thereby energized and the wipers 119, 120 and 121 of the selector E are raised to the second bank level opposite the first contact of said level. The energizing circuit for the said vertical magnet 96 extends from ground $G^5$ through the springs 110 and 111, private springs 105 and 106 to the vertical magnet 96, thence to the battery lead 160 and through battery B to ground G. The spring 24 is then pressed onto the ground post 20, grounding the rotary line conductor 32 and, therefore, energizing the rotary line relay 109 of the selector E. The energizing current passes from ground G' to the rotary line conductor 32, thence it flows through the line switch bank springs 65 and 66, rotary trunk conductor 91, side switch wiper 101 of the selector E, contact point 171 to the rotary line relay 109, thence to the battery lead 160, and through battery B to ground G. The rotary line relay upon operating presses the line relay spring 112 onto the ground spring 110, thereby establishing a circuit through the private magnet 99 from ground $G^5$ through the springs 110 and 112 to the private magnet 99, and through the said magnet to battery lead 160, thence through battery B to ground G. The private magnet upon energizing and deënergizing permits the selector side switch to pass from first to second position, permitting the side switch wipers 102 and 103 to engage the contact points 172 and 173, respectively. The closure of connection between the side switch wiper 102 and the contact point 172 sets up an energizing circuit for the rotary magnet 97 from ground $G^6$ to the contact point 172, through the side switch wiper 102, interrupter springs 107, rotary magnet 97 to the battery lead 160, and through battery B to ground G. The said rotary magnet 97 then operates to rotate the wipers 119, 120 and 121 of the selector E into engagement with the first contact of the second level of the selector banks, from which contacts, it is assumed the trunk line conductors 175, 176 and 104 lead to the selector F. If the first trunk is busy, however, the wipers have to pass over busy trunk lines, and then as soon as the private wiper 121 engages the first grounded private bank contact point, the private magnet 99 energizes again, locking the side switch in second position. The energizing circuit for said private magnet extends from the grounded terminal G of battery B through an occupying switch (not shown) to the private wiper 121, thence over the conductor 174 and through the back-release relay 115 to the side switch wiper 103, contact point 173, private magnet 99, thence through said magnet to the battery lead 160, and through battery B to ground G. The private magnet 99 upon thus becoming energized locks the side switch wiper 102 in engagement with the grounded contact point 172, whereby the rotary magnet 97 will be energized intermittently until the wipers are carried beyond the last busy trunk line. At the instant that the private wiper leaves the last busy contact point the energizing circuit through the private magnet 99 is destroyed, and as a result the selector side switch passes to third position. If, however, there are no busy trunk lines, the armature of the rotary magnet 97 releases the side switch to third position as soon as the wipers are carried into engagement with the first trunk line. As soon as the side switch passes to third position, as stated, the subscriber's line conductors 31 and 32 are extended to the conductors 175 and 176, which in this case, it is assumed, lead to the selector switch F. The extension of the line occurs, of course, as soon as the side switch wipers 100 and 101 engage the contact points 177 and 178, respectively. Not only is the subscriber's line thus extended, but a guarding potential is also established at the private wiper 121, when the side switch wiper 103 passes onto the grounded contact point 179, for protecting the seized trunk line from interference by other calling subscribers. This guarding potential extends from ground $G^7$ to the contact point 179, thence through the side switch wiper 103, back-release relay 115, and conductor 174 to the private wiper 121. It will be evident, of course, that the energizing circuit for the rotary magnet 97, to which reference has already been made, is destroyed when the idle trunk line is seized—that is, when the side switch wiper 102 leaves the contact point 172. The second digit of the called number being 2, the calling subscriber operates his dial accordingly, as a result grounding the vertical line conductor 31 when the spring 23 meets the ground post 20. The vertical line relay 188 of the switch F is, therefore, energized twice by a flow of current from the substation ground G' to the vertical line conductor 31, thence through the line switch bank springs 63 and 64 to the vertical trunk conductor 90, thence to the side switch wiper 100 of the selector E, contact point 177, vertical line wiper 119, vertical trunk conductor 175, side switch wiper 187, vertical line relay 188 to the battery lead 160, thence through battery B to ground G. That is, when the vertical line conductor 31 is grounded for the second digit the vertical line relay 188 operates to close a circuit through the vertical magnet 264ª, which operates to carry the shaft wipers step by step to a point opposite the bank terminals of the second level. When the rotary line conductor 32 is grounded after the vertical impulses the rotary line relay 206 is energized, whereby an energizing circuit is established through the private magnet 123, which in turn operates in the usual way to release the side switch, as described in connection with switch E. After the switch F comes to rest its shaft wipers 189 and 190 are in engagement with the trunk conductors 192 and 193, respectively, which lead to the line switch I (Fig. 3). The private wiper 191 establishes a protecting potential at the contact 194 for guarding the seized trunk line. Furthermore, the trunk conductors 192 and 193 terminate in the bank of the line switch K. Now, when the dial is turned clockwise for the third digit the preliminary rotary impulse, as previously explained, energizes the trip magnet 140 which operates, as explained in connection with the line switch C, to seize a trunk line leading to the connector H. The energizing circuit of the trip magnet 140 extends from the substation ground G' to the rotary line conductor 32, trunk conductors 91, 176 and 193 to the conductor 165 (Fig. 4), then to the conductor 165 (Fig. 3), through the cut-off springs 142 and 143, through the trip magnet 140 to the motor magnet springs 166 and 167, through the motor magnet 168 to the battery lead 160, and through battery B to ground G. The trip magnet upon energizing operates to permit the plunger arm 146 to trip-in, whereby the springs 180 and 181, 182 and 183, 184 and 185, and 186 and 187ª engage. When the plunger arm 146 operates, the cut-off spring 142 is carried out of engagement with the spring 143 by the bushing 145 upon the end of the plunger arm 146. The disengagement of these springs cuts off the conductor 165 from the trip magnet 140. When the springs 182 and 183 are carried into engagement by the plunger of the switch I, an energizing circuit is established through the motor relay 195 of the master switch J. This circuit extends from ground G⁸ through the said relay, common segment 196 of the bank of the master switch J, and wiper 197 to the segment 198, then through the bank springs 183 and 182, through the winding of the release magnet 141 to the battery lead 160, and through battery B to ground G. The relay 195 now energizes and operates to close the springs 199 and 200 in contact, whereby an energizing circuit is closed through the motor magnet 168. Although the release magnet 141 is included in the energizing circuit of the motor magnet relay 195 it does not operate, since the relay 195 is wound to a high resistance, while the release magnet 141 is wound to a comparatively low resistance. The motor magnet 168 upon energizing operates the plunger shaft, as explained in connection with the line switch C and the master switch D, to carry the engaging plungers opposite the next idle trunk line which leads to a second connector switch. When the bank springs 180 and 181, and 186 and 187ª engage, the calling subscriber's line conductors 31 and 32 are extended to the connector trunk conductors 201 and 202. The ground impulses from the substation to the line conductors for the last two digits—namely the third and fourth—are directed toward the connector H. For the third digit 2 the vertical impulse spring 23 is pressed onto the ground post 20 twice, whereby an energizing circuit is closed each time through the connector vertical line relay 128. This circuit extends from ground G' through the ground post 20, spring 23, line conductor 31, springs 63 and 64, trunk conductors 90, 175 and 192, conductor 152, springs 180 and 181, vertical line relay 128 to the battery lead 160 thence through battery B to ground G. Each time that the vertical line relay 128 is energized the line relay springs 203 and 204 are pressed into contact, thereby closing an energizing circuit each time through the vertical magnet 130 which operates in the usual manner one step at a time. The shaft wipers 125 and 127 are, therefore, raised two steps and brought opposite the level in which are located the terminals of the conductors 205 and 207 that lead to the incoming and outgoing line switches of the called line. Of these conductors to conductor 207 is the private normal conductor and leads directly to the spring 243 of the bridge-cut-off relay 236 of the outgoing line switch C'. This conductor is adapted to be grounded and maintained so when the line #2220 is busy, either by being called or by calling. The conductor 214 may be termed the master switch starter and leads to the master switch M of the group to which the incoming individual switch K belongs, passing through the motor starter relay 213 to ground G¹⁰. When the connector side switch passes to third position it will be shown that by means of this conductor the said motor starter relay 213 is connected in series with the private magnet 133, and through said private magnet to the non-grounded pole of the battery. The said motor starter relay, as will be more fully explained, starts the master switch M and the latter operates until the wiper 223 strikes the contact in which terminates the conductor 210 which leads through the line switch I to the release relay 132 of the connector H, thus causing the said release relay 132 to energize, releasing both the connector H and the line switch I and, at the same time, tripping the incoming individual switch K of the line #2220 by sending a ground impulse over the remaining one of the said conductors, namely the conductor 205, through the said trip magnet 147 to the non-grounded terminal of battery. After the connector shaft has been raised by the vertical impulses, the rotary impulse is sent in for the third digit. This is done when the rotary impulse spring 24 makes contact with the ground post 20, thereby closing an energizing circuit through the rotary line relay 129 extending from ground G' through the ground post 20 and spring 24, line conductor 32, trunk conductors 91, 176 and 193, conductor 165, springs 186 and 187ª, through the rotary line relay 129 to the battery lead 160, thence through battery B to ground G. The rotary line relay upon operating closes an energizing circuit through the private magnet 133, which operates to release the connector side switch from first to second position. The last digit being 0 the calling device is operated, as previously described, grounding the vertical conductor 31 ten times and the rotary line conductor 32 once. The vertical and rotary line relays 128 and 129 are operated over previously traced circuits. However, when the line relay springs 203 and 204 engage, a circuit is closed through the rotary magnet 131 instead of through the vertical magnet 130. Each time that the rotary magnet is energized it operates to rotate the shaft and shaft wipers 125 and 127 one step at a time until the said wipers are carried into engagement with the conductors 205 and 207 which are allotted to the line of substation A'. The energizing of the rotary line relay 129, as previously stated, completes an energizing circuit through the private magnet 133 which now operates to release the side switch from second to third position, thus placing the side switch wipers 135, 136, 138 and 139 in contact with their respective contact points. When the side switch wiper 135 engages the contact point 208 a ground potential is established at the bank contact of the master switch M (Fig. 4) corresponding to the conductors 192 and 193 of the trunk line. This potential extends from ground G⁹ at the connector H through the release relay 132, contact point 208, side switch wiper 135, conductor 209, bank springs 185 and 184, conductor 210 to the segment 211 at the master switch bank, Fig. 4. The side switch wiper 136 upon engaging the contact point 212 closes an energizing circuit through the motor magnet relay 213 (Fig. 4) extending from ground G¹⁰ through the said relay 213, conductor 214, side switch wiper 136, release relay springs 215 and 216, through the private magnet 133 to the battery lead 160, and through battery B to ground G. The relay 213 energizes and places the springs 217 and 218 in contact, whereby an energizing circuit is closed through the motor magnet 221 from ground G¹¹ through the springs 217 and 218, motor magnet interrupter springs 219 and 220, through the motor magnet 221 to the battery lead 160, and through battery B to ground G. As long as the connector H remains with the side switch wiper 136 in third position the energizing circuit through the relay 213 is maintained, and also the energizing circuit through the motor magnet 221. The motor magnet continues to operate, rotating the ratchet wheel 222 step by step until the wiper arm 223 is carried into engagement with the segment 211 which, as already described, is grounded through the release relay 132 of the connector switch H. As a result, when the wiper arm 223 engages the segment 211, an energizing circuit is closed through the release relay 132. This circuit extends from ground G⁹ at the connector H through the relay 132 and side switch wiper 135, as explained, to the segment 211, then through the wiper 223 to the common segment 224, thence to battery lead 160, and through battery B to ground G. The relay 132 upon energizing operates to release the connector switch H and also the line switch I. Now when the connector releases, the side switch wipers 135 and 136 then leave their respective contact points 208 and 212, whereby the energizing circuits through the release relay 132 and through the motor magnet relay 213 are broken. The energization of the release relay 132 not only releases the connector switch H and the line switch I, but also at the same time closes an energizing circuit through the trip magnet 147 of the line switch K. The circuits through the release magnet 134 of the connector H and through the release magnet 141 of the line switch I, it will be understood, are subsequently broken when the release relay 132 deënergizes and permits the springs 225, 226 and 227 to separate. It will be understood, therefore, that the releasing of the connector switch H and of the line switch I occurs as soon as the wiper 223 of the master switch M engages the segment 211, the mechanism of the master switch being so timed in its operation that the release relay 132 of the connector switch has time to energize and to in turn energize the release magnets of the connector switch H and line switch I; and finally the motor magnet relay 213 has time to interrupt the motor magnet circuit before the master switch has time to operate and carry the wiper 223 out of engagement with the contact point 211. More particularly, the operations of the release relay 132 are as follows: When said relay energizes, as described, the springs 215 and 216 are disengaged, whereby the energizing circuit of the motor magnet relay 213 is broken, and at the same time that the springs 215 and 216 are disengaged the springs 225, 226 and 227 are carried into contact, whereby the energizing circuits for the release magnet 134 of the connector H and of the release magnet 141 of the line switch I and of the trip magnet 147 of the line switch K are established. The circuit through the release magnet 141 extends from ground $G^{12}$ through the springs 227 and 226 of the release relay 132, through the line switch bank springs 183 and 182 to the magnet 141, then through said magnet to the battery lead 160, and through battery B to ground G. The circuit through the release magnet 134 extends from ground $G^{12}$ through the springs 227 and 226, through the winding of the release magnet 134 to the battery lead 160, and through battery B to ground G. The circuit through the trip magnet 147 extends from ground $G^{12}$ through the springs 227, 226 and 225, through the shaft wiper 125 to the conductor 205, through the trip magnet 147 to the battery lead 160, and through battery B to ground G. The release magnets 141 and 134 being thus supplied with current operate in the usual manner to restore their respective switches. The connector H returns to normal position in readiness to be seized and again operated to establish connection between a second-selector trunk line and some subscriber's line switch. It will be remembered that the master switch M has operated to carry the idle plungers of the line switches which it controls to a point opposite the bank terminal of the trunk line conductors 192 and 193; and now when the trip magnet 147 operates, the conductors 192 and 193 are extended to the line conductors of substation A'; the conductor 192 through the bank springs 228 and 229 to the line conductor 232; and the conductor 193 through the bank springs 230 and 231 to the line conductor 233. When the bank springs 234 and 235 engage, a series energizing circuit is closed through the cut-off relay 144 of the trunk line switch I, and through the cut-off relay 236 of the line switch C' allotted to the line of substation A'. This circuit extends from ground $G^{13}$ (Fig. 3) through the cut-off relay 144 to the conductor 237, through the bank springs 234 and 235, conductor 238, through the cut-off relay 236 to the battery lead 160, and through battery B to ground G. The cut-off relay 144 upon energizing maintains the springs 142 and 143 disengaged after the switch I has been restored. This provision is made in order that the line switch I cannot be "tripped-in" or operated when a ground impulse comes upon the rotary line conductor 193 during the release. The cut-off relay 236 upon energizing operates to disengage the springs 239, 240 and 241 and to carry the springs 242 and 243 into contact. When the above-mentioned springs disengage, the line conductors 232 and 233 are disconnected from the trip magnet $236^a$, and from each other; and when the springs 242 and 243 engage, a guarding potential is then established at the connector bank for protecting the called line. The potential extends from ground $G^{14}$ through the springs 242 and 243 to the conductor 207 which leads to the connector bank contact corresponding to the line of substation A'. The conductors 31 and 32 of substation A having been extended to the line conductors 232 and 233 of substation A', the subscriber at substation A signals substation A' by pressing the button 37, thereby carrying the spring 35 into engagement with the ground spring 38, whereby an energizing circuit is closed through the ringer relay 244. This circuit extends from ground G', contact point 38, spring 35 to the vertical line conductor 31, trunk conductors 90, 175 and 192, through the ringer relay 244 at the secondary switch K to the battery lead 160, and through battery B to ground G. The ringer relay upon energizing operates in the usual manner to separate the calling and called lines, and to bridge across the latter the terminals of the ringer generator P to operate the ringer 245 at substation A'. The subscriber at substation A', upon removing the receiver 246 from the switch-hook 247, may converse with the subscriber at substation A over the circuit shown by the heavy lines in Figs. 1, 2 and 4.

The release of the central office switching apparatus occurs when the calling subscriber restores the receiver 2 to the switch-hook 3, thereby pressing the release springs 7, 8 and 9 into engagement for a moment. The contact of the said release springs grounds the vertical and rotary line conductors 31 and 32 simultaneously from ground G' to the release spring 7, thence through the springs 8 and 9 to the vertical and rotary line conductors, thereby simultaneously energizing the vertical and rotary line relays 188 and 206 of the second-selector F, whereby the release relay 115 of the selector E is energized in series with the release magnet 248 of the selector F. Furthermore, when the vertical and rotary line conductors 31 and 32 are grounded the ringer relay 244 and the relay 249 also energize simultaneously, thereby pressing the springs 250 and 251 into contact. The engagement of these springs closes an energizing circuit through the release magnet 148 of the line switch K extending from ground $G^{17}$ through the springs 250 and 251, bank springs 252 and 253, through the release magnet 148 to the battery lead 160, and through battery B to ground G. The path of the series circuit through the release relay 115 and release magnet 248 extends from ground G⁷ to the side switch wiper 103, release relay 115, selector shaft wiper 121, trunk-release springs 122 and 254, release magnet 248 to the battery lead 160, thence through battery B to ground G. When the selector release magnet 248 is thus supplied with current it energizes. The back-release relay 115 of the selector E, being in the same circuit with the release magnet 248, energizes simultaneously with the latter and presses the springs 255 and 256 into engagement, which in turn close an energizing circuit through the release magnet 48 of the line switch C in multiple with the release magnet 98 of the selector E. The circuit through the release magnet 98 extends from ground G¹⁶ through the release relay springs 255 and 256, through the winding of the release magnet 98 to the battery lead 160, thence through battery B to ground G. The circuit through the release magnet 48 of the line switch C extends from ground G¹⁶ through the springs 255 and 256 and through the line switch bank springs 70 and 69, through the magnet 48 to battery B. All of the relays and magnets thus energized attract their respective armatures, and remain in readiness to release the apparatus they control, and as soon as the substation release springs 7, 8 and 9 separate and break the ground connection with the line conductors 31 and 32, these relays and magnets again deënergize. The calling subscriber in this way restores all the switching apparatus which he originally brought into use.

Thus it has been shown how the central office switches may be operated to establish a connection and again release the same. Having now described the apparatus and the method by which one subscriber obtains connection with another, and the method and means by which the calling subscriber releases or restores the switching apparatus after a call is made, I will now proceed to point out the manner in which the busy-release is brought about—that is, the manner in which a connector switch is prevented from establishing connection with a line which is busy, either by means of calling or being called. In either event the bridge-cut-off relay 236 of the line switch C′ energizes and operates as explained to place a ground potenital at the connector bank corresponding to the line. Suppose that the connector H is seized and operated to establish connection with the conductors 205 and 207 while the line #2220 is engaged. In that event, when the rotary line relay 129 operates to energize the private magnet 133 for releasing the side switch from second to third position, to establish connection with the switches C′ and K, since the private normal conductor 207 is grounded, the private magnet 133 will energize and close the springs 257, 258 and 259 in contact, establishing an energizing circuit through the release magnet 134 of the connector, which will release the said connector and restore the side switch to first position. An energizing circuit is also closed through the release magnet 141 of the line switch I, which is in turn released from the trunk line conductors 201 and 202. As explained, this occurs at the instant that the last rotary impulse is sent to the connector H. The connector and line switch having been thus released, then when the calling subscriber grounds his vertical line conductor 31 to signal, as already explained, instead of operating the substation ringer 245 (since the line switch K is not tripped) he will accomplish nothing, since the vertical trunk conductor 192 is open both at K and I, and upon listening for an answer will receive a busy signal from the busy machine N. The busy signaling current will, of course, extend from the coil 260 through the trip magnet 140, springs 143 and 142 to the rotary trunk conductor 193, thence through the substation and back through the vertical line conductor 31, through the vertical line relay of the selector F to the battery lead 160, and to the coil 260. Upon receiving the busy signal the calling subscriber will hang up his receiver, ground both line conductors, and cause the energization of the vertical and rotary line relays 188 and 206 of the selector F, which will in turn operate to close a series circuit whereby the release magnet 248 of the selector F and the release relay 115 of the selector E are energized. Not only do the line relays 188 and 206 energize when the line conductors 31 and 32 are grounded simultaneously, but since the ground impulse to the rotary line conductor 32 continues beyond the selector F to the rotary trunk conductor 193, the line switch I is again tripped (since the cut-off relay 144 is not energized), and the bank springs 180 and 181 and the bank springs 186 and 187ᵃ are brought into contact, in the manner already explained, and the circuit through the trip magnet 140 is broken. At once the line relays 128 and 129 of the connector H energize simultaneously, whereby the private magnet 133 is energized as soon as the rotary line relay 129 presses the spring 204ᵃ onto the ground spring 203, which private magnet then presses the springs 257, 258 and 259 into contact, thereby closing a circuit through the release magnet 134 from ground through the line relay springs 203 and 204, through the springs 257, 258 and 259 to the release magnet 134, and at the same time over a multiple circuit to the release magnet 141 of the line switch I, thence through both of the above release magnets 134 and 141 to the non-grounded terminal of battery B and to ground G. Both of said release magnets energize and remain so long as the line conductors 31 and 32 are grounded; but when the ground to the line conductors is removed the switches are all released in a manner already explained.

It has been shown how a subscriber of the sub-central #1100 may operate the switches to establish connection with the line of a subscriber of the sub-central #2200. Suppose that the subscriber at substation A of the sub-central #1100 calls another subscriber of the same sub-central. In that event the central office switches, the first-selector and second-selector are operated in the same manner, as explained, to select a trunk line leading back to a connector switch in the sub-central #1100. The circuits and switches over which this connection is brought about are similar to the circuits and switches employed when the subscriber #1150 called the subscriber #2220, and will be readily understood. Assume, now, that the subscriber at substation A of the sub-central #3300 desires to call and signal the subscriber at substation A' of the same sub-central. In each case the connection is not established by way of the main central office, as in the preceding instance, but by means of switching apparatus located only at the sub-central #3300. The line switch C is operated by the preliminary impulse to select an idle trunk line leading to the second line switch I, Fig. 3ª. The second line switch I in turn operates to select an idle trunk line leading to a connector switch H, which latter is then operated, as explained, to establish the final connection. It will be seen that there are no first or second selector switches in this connection, the only numerical switch being the connector H; hence, when the subscribers of the sub-central #3300 call another subscriber of the same sub-central, the dial is operated for the connector digits only—that is, the last two digits; but when subscribers of other sub-centrals call subscribers of sub-central #3300 the first and second selector of the main central exchange are then included in the connection, and, therefore, all four digits of the number are called on the dial. To call the subscriber at sub-central A' on the line #3320 the subscriber at substation A operates the dial for the last two digits (2 and 0). When the dial is turned for the digit 2 the line switch C (Fig. 1ª) is operated by the preliminary impulse and extends the subscriber's line conductors to the trunk conductors 90 and 91 leading to a second line switch I. The subscriber's rotary line conductor 32 is extended to the trip magnet 140 of the second line switch, and the trip magnet of this second line switch is in turn energized and operated by the same preliminary impulse which operates the line switch C. The second line switch, upon operating, seizes an idle trunk line leading to a connector switch H, in the same manner that the first line switch operated to seize an idle trunk line leading to a second line switch. Furthermore, upon referring to Fig. 1ª it will be seen that the relays 300 and 301 are normally connected in series with the battery terminals, and the resistance of the windings is such that the said relays do not operatively energize when thus connected; but when either relay is included in a series circuit with a comparatively low wound magnet the said relay operatively energizes; hence, when the bank springs 69 and 70 engage, an energizing circuit is established which extends from ground through the relay 300, trunk conductor 92, through the springs 70 and 69, winding of the release magnet 48, to the battery lead 160, thence through battery B to ground G. Although the release magnet is included in this circuit it does not operatively energize, since the current flowing is small in comparison to the normal energizing current. The relay 300, however, energizes and shifts the spring 302 out of engagement with the spring 303 and into engagement with the spring 304. When the spring 302 engages the spring 304 a ground potential is established to the conductor 305 which extends to the second-selector banks in the main central exchange, to protect the trunk line conductors 306 and 307 against seizure by a second-selector (Fig. 2) operated by a subscriber calling into the #3300 sub-central. As shown in Figs. 2 and 1ª, the trunk line leading to the line switch I (Fig. 3ª) may be seized by a second-selector of the main central exchange, or by a line switch of the 3300-group. In either event, when the trunk line switch is in use by a second-selector or by a line switch it is protected against seizure by the other switch. When a second-selector calls in on the trunk conductors 306 and 307 the second-selector establishes a ground potential to the conductor 305 through the springs 302 and 303 (Fig. 1ª) to the conductor 92, thence to the contact 89 of the master switch bank O, whereby a circuit is closed through the motor magnet relay 73 when the master switch wiper 75 engages the contact point or segment 89, as explained. Also, the ground potential to the conductor 305 at the second-selector bank provides a circuit through the relay 301, said circuit extending from ground to the conductor 305, through the springs 302 and 303, through the relay 301, battery lead 160, thence through battery B to ground G. The relay 301 energizes and operates to disengage the springs 308 and 309, whereby the trunk conductor 92 leading to the bank spring 252 (Fig. 4ª) is disconnected from the conductor 305. This provision is made in order that the ground potential to the conductor 305 may not be transmitted to the release magnet 148 (Fig. 4ᵃ) when the line switch K is operated. The relay 300 operates, as above stated, to place a protecting potential upon the trunk conductor 305, to prevent seizure by a second-selector switch in the main central while the line switch I is in use by a local subscriber. Now, when the dial returns to normal position for the digit 2 the connector switch H is operated two steps. Also, when the dial returns to normal position for the digit naught the connector shaft is rotated ten steps, and the master switch M.(Fig. 4ᵃ) is in turn operated to carry the idle plungers opposite the trunk conductors 90, 91,and 92, when an energizing circuit is closed through the trip magnet 147; and the line switch K is tripped in on the trunk conductors 90 and 91, extending the calling subscriber's conductors 31 and 32 to the normal conductors 266 and 267 in the same manner explained in connection with the operation of the switches when the substation #1150 called substation #2220. The connector H, having extended the trunk conductors to the normal conductors through the line switch K, as explained, is automatically released and restored; also, the line switch I is released from the trunk conductors 201 and 202 in exactly the same manner, as explained. When the calling subscriber presses the signaling button 37 an energizing circuit is closed through the ringer relay 244 and the called subscriber is signaled in the usual way. The talking circuit between the two substations A and A' is shown by the heavy line conductors in Figs. 1ᵃ and 4ᵃ. The release of the line switches is brought about when the calling subscriber restores the receiver to the switch-hook and grounds both line conductors 31 and 32 simultaneously whereby the relays 244 and 249 energize simultaneously and press the springs 250 and 251 into contact, thus closing a multiple circuit through the release magnets 148 and 48. The circuit through the release magnet 48 of the individual switch C (Fig. 1ᵃ) extends from ground G¹⁷ through the springs 250 and 251, private trunk conductor 92, bank springs 70 and 69, release magnet 48 to the battery lead 160, thence through battery B to ground G. When the ground to the line conductors 31 and 32 is removed the relays 244 and 249 deënergize and break the energizing circuit through the release magnets 148 and 48, which in turn deënergize, restoring their respective line switches to normal position in the usual manner. The manner in which the subscribers may call subscribers outside of the sub-central #3300 is somewhat different from that explained in connection with the substations #1150 and #2220. When the subscriber at substation A of the sub-central #3300 (Fig. 13) desires to communicate with the subscriber at substation #2220, an operator or attendant at the sub-central #3300 is signaled by the calling subscriber—that is, the operator is given one or more numbers, and a subscriber calling out calls the operator first, the operator's call coming in at the jack j. The answering plug of the cord circuit k is inserted in the jack j, and the operator upon learning that substation #2220 is wanted inserts the calling end of the cord circuit k into one of the outgoing trunk line jacks j'. A key m is then operated to bridge the operator's calling device d across the outgoing trunk conductors, by means of which device the central office and the sub-central switches may be operated to establish connection with the substation #2220, and thus the two substations A of the sub-central #3300 and A' of the sub-central #2220 may be connected by means of the cord circuit k. The subscriber at substation A, upon restoring the receiver to the switch-hook, grounds both line conductors simultaneously, thus initiating the release of the sub-central switches. The main central office switches and the switches of the sub-central #2200 are released when the operator removes the plug from the jack j. From the foregoing it will be seen that the subscribers of the sub-central #3300 may call each other automatically, without operating switches outside of the #3300 sub-central; that any subscriber of the system may call automatically and establish connection with any subscriber of the #3300 sub-central; that any subscriber outside of the #3300 sub-central calling another subscriber outside of the #3300 sub-central must call through the main central office; also, that a subscriber of the #3300 sub-central in obtaining connection with a subscriber outside of this sub-central does so by means of a cord circuit.

It is evident that with my new arrangement the number of connectors employed in a system may be materially reduced. Heretofore each trunk line from the second-selector banks to the connector switches was allotted to a connector—that is, there were as many connector switches as there were trunks, but with my new arrangement the trunk lines terminate in line switches which may be operated to select an idle connector switch. Since the connectors are employed only for operating the incoming line switch of the called line, as explained, and are then automatically released and restored, it is evident that they are in use only a very short time, and that two or three connectors may properly take care of a set of ten trunk lines, whereas heretofore a connector has always been allotted to each trunk line.

It has been explained how each master switch is provided with an interrupter mechanism controlled by the motor magnet thereof. For a successful operation of the system herein described it is not necessary that any special form of interrupter should be employed, but any suitable type of interrupter may be used, such, for example, as the interrupter disclosed in United States Letters Patent No. 841,004, granted January 8, 1907, to John Erickson.

Figs. 1, 2, 3 and 5 show more or less of a limited section of the system, and for the purpose of giving a more general idea of the efficiency of the switches, and of the trunking arrangement, Fig. 13 has been provided. In this figure the eleven-hundred sub-central, which comprises the line switch C, and to which the substation A or #1150 belongs, is shown. As shown, each substation has allotted to it an outgoing line switch C, all of which are arranged in a row. Opposite each of these line switches C is shown an incoming line switch, one of these incoming line switches and one of the outgoing line switches being allotted to each line. This is more clearly shown at the #2200 sub-central where the outgoing line switch C' and an incoming line switch K are allotted to the substation A' or #2220. In said Fig. 13 there are shown altogether four sub-centrals, the #1100, #1200 and the #2200 sub-centrals, as explained, and also the sub-central #3300. Referring more particularly to the #2200 sub-central it will be noticed that the equipment consists of the outgoing line switches C' and the incoming line switches K, the trunking switches I, and the connectors H allotted to said line switches I. Furthermore, each group of line switches has its own master switch. For example, the line switches C' are controlled by the master switch L, the line switches K by the master switch M, and the line switches I by the master switch J. It will be understood that there may be one hundred subscribers A' allotted to the #2200 sub-central. Of course, the number of switches C', as well as the number of switches K, will correspond to the number of subscribers A', while the number of switches I is only a percentage of the total number of subscribers A' (ten per cent., for example), and the number of connector switches H may in turn be a percentage of the line switches I (twenty per cent., for example). This arrangement and description, of course, applies to each of the other sub-centrals also. At the main central office the first and second selectors are arranged in groups of one-thousand, as indicated from left to right. In a one-thousand-group the first-selectors of the #1100 sub-central are shown at E, while the first-selectors of the other sub-centrals in the same thousand are shown in the same vertical rows. In the same thousand-row, and to the right of the first-selectors, are shown the second-selectors; and in the second thousand the first one-hundred second-selectors are shown at F, which group of second-selectors, of course, comprises a second-selector F shown in Fig. 2. By the arrangement shown in Fig. 13 it will be seen at a glance that the one-thousand first-selectors and second-selectors are in one column, as already explained, the two-thousand in another column, the three-thousand in still another column, and so on. It will also be seen that at right-angles to these columns the one-hundred first-selectors of these thousands, together with the one-hundred second-selectors of these thousands, are in line; and the same is true of the two-hundred first-selectors and second-selectors of these thousands, and of the three-hundred, and so on. It will be understood, of course, that the one-hundred second-selectors of these thousands are all common to the one-hundred first-selectors of the same thousands, the same being true of the other hundreds. It will be evident, however, that if a selector shaft rises to the first level the second-selectors in the first thousand are selected; if raised to the second level the second-selectors of the second thousand are selected, and so on. In like manner it will be evident that the second-selectors in any thousand can establish connection with only the sub-centrals of that thousand. For example, the second-selectors F of the second thousand can establish connection with only one of the sub-centrals of the second thousand, depending upon what level the selector picks out. For example, if the wipers are raised to the first level the #2100 sub-central (not shown) is reached; if raised to the second level the #2200 sub-central is reached, and so on. Therefore, if the subscriber at sub-central A, which is a member of the eleven-hundred-group, calls the subscriber at substation A', which is a member of the twenty-two-hundred-group, a first-selector switch E of the eleven-hundred-group in the main office is operated and the shaft wipers raised to the second level, which leads to the second-selectors of the twenty-first-hundred-group. In this group the second-selector F, which is assumed to be the one selected, is operated, and the shaft wipers are raised two steps and brought to the second level from which trunk lines lead to trunking line switches of the twenty-two-hundred-group of subscribers' substations. The line switch I is first operated, and in turn the connector switch H to establish the final connection, as explained, not through the connector H and line switch I, but by an auxiliary circuit set up by the operation of these switches H and I that leads directly from the banks of the second-selectors and through the incoming line switch K to the line of the desired subscriber.

From the foregoing it will be seen that I use both numerical and non-numerical switches and that in the automatic extension of connection from a calling line to a called line the numerical switches are intermediate of the non-numerical switches. By a numerical switch I mean a switch adapted to perform either a trunking or a connecting operation in accordance with one or more digits of the called number, and which is under the direct control of the calling subscriber for the purpose of selecting some certain line, or for the purpose of selecting some certain group of trunk lines. By a non-numerical switch I mean a switch adapted to perform a switching operation without reference to the called number, and which is not under the control of the calling subscriber for the purpose of selecting either a certain line or a certain group of lines—that is to say a switch that can only be set in motion by the calling subscriber, and which will then automatically and of its own accord connect with an idle line. It will be seen therefore, that the selectors and connectors herein described are in the nature of numerical switches, as the selectors are used by the calling subscribers for arbitrarily selecting different groups of trunk lines, or different sections of the exchange, while the connectors are used not only for selecting different groups of subscribers' lines, but are also still directly under the control of the calling subscribers for the purpose of selecting certain definite and predetermined subscribers' lines. On the other hand the subscribers' individual switches herein disclosed, as well as the intermediate trunking switches I, are in the nature of non-numerical switches, as they are not under the control of the calling subscribers for the purpose of selecting either a group of lines, or a certain definite line. The connectors H are automatically selected by the trunking switches I, and immediately upon the operation of the said connector both of these switches are automatically cut out of the connection which has been extended from the calling line to the called lines, leaving the two lines connected for talking purposes. As explained, this automatic disruption or breaking down of the primary connection extended from the calling line to the called line is accompanied by the automatic extension of a talking connection from the called line back in the direction of the calling line. In other words, more or less of the trunking connection by which a called line is found is broken down and a new or talking connection substituted therefor. In this way more or less of the primary connection is released and restored to normal condition, placing the same in condition for use by other subscribers. Consequently, the connectors or final numerical switches, as herein disclosed, are not used for talking purposes, and are not retained for use between calling and called telephone lines, but are simply employed for finding the called lines. When the called lines are found, the connectors are automatically released and a substitute or talking connection automatically extended from the called line back in the direction of the calling lines, thus placing the connector at the disposal of other subscribers. Each calling subscriber only uses a connector for an instant, and then this connector is restored to condition for use by other subscribers. It will also be seen that the subscribers' individual switches are divided into two classes, one by which the subscribers call, and the other by which the subscribers are called. To the latter class lead the trunks having the ringer relays, and it will be seen that these relays are common to all of the subscribers of the group to which they belong. With such arrangement it is evident that the said connectors or final numerical switches may be reduced to a comparatively small number, even in an exchange of considerable size, and even where the calls are frequent and the service accordingly heavy. It is also evident that I provide an arrangement by which a calling subscriber can extend connection from his line to the called line through the medium of numerical and non-numerical switches, and that as soon as the connection is completed all of the numerical switches are cut out and restored to normal condition, leaving the lines connected only through the medium of those switches which are individual to the two lines. In other words, and as illustrated more clearly in connection with the sub-central station #3300, the subscribers' lines are connected through the medium of both individual and common switches, but during conversation the switches that are common to the subscribers are cut out and restored to normal condition, leaving the connected lines intact through the medium of those switches which are individual to the subscribers, and leaving all common switches in condition for use by other subscribers. In this way, and as far as this feature or aspect of my invention is concerned, calling and called subscribers are never permitted to monopolize common switches during conversation, and are only permitted to use such class of switches for the purpose of primarily extending connection from a calling line to a called line; for after that the talking connection between the two lines is maintained by devices which are individual to the subscribers, and all those switches which are common to the various subscribers of the system or exchange are instantly returned to normal condition. It will be seen, therefore, that with such arrangement and mode of operation the trunk-selectors or connectors or other common switches can be considerably less in number than heretofore, inasmuch as they are not used for talking purposes, and are only used for a brief instant by any calling subscriber.

What I claim as my invention is:—

1. In a telephone system, a selector, a trunk line leading from said selector, a couple of line switches allotted to said trunk line, the first line switch operable directly from said trunk line, a connector switch adapted to be seized by said first line switch, the said connector switch adapted to be operated after being seized by said first line switch whereby a circuit connection may be completed to the second line switch and to the subscriber's line allotted to said second line switch, means whereby said second line switch is automatically operated to connect the trunk line directly to the subscriber's line and to at the same time cause the automatic release of the connector and said first line switch.

2. In a telephone system, a subscriber's substation, a line allotted thereto, switching means individual to said line comprising two line switches, a trip magnet adapted to be operated when a call originates in said substation, and another trip magnet adapted to be operated when the said substation is called.

3. In a telephone system, a subscriber's substation, a line allotted thereto, switching means individual to said line comprising two line switches, a trip magnet adapted to be operated when a call originates in said substation, a trip magnet adapted to be operated when the said substation is called, a release magnet for restoring the first one of said line switches when the first mentioned trip magnet operates, and another release magnet for restoring the second line switch when the second mentioned trip magnet operates, said release magnets being always operated by the calling subscriber.

4. In a telephone system, a substation, a line allotted thereto, switching mechanism individual to said line comprising two release magnets, one for use when the line is called and the other for use when the line calls.

5. In a telephone system, groups of trunk lines, a substation, a line allotted thereto, switching mechanism individual to said line comprising a couple of magnets, one for use when the line is called and the other for use when the line calls for closing the subscriber's line with one of the trunk lines of either one of two groups of trunk lines.

6. In a telephone system, a subscriber's station and a line allotted thereto, switching mechanism individual to said line, a main central office and a sub-central office, said switching mechanism allotted to said sub-central, incoming trunk lines leading from the main central to the sub-central, outgoing trunk lines leading from the sub-central station to the main central station, and means whereby the said line switching mechanism may be operated to connect the subscriber's line with one of the trunk lines of either one of said sets of trunk lines.

7. A telephone system comprising a group of selectors, a group of line switches, a set of trunk lines common to said selectors, each of said trunk lines having a set of multiple terminals associated with said group of selectors and each of said trunk lines also having a set of multiple terminals associated with said group of line switches, whereby a talking circuit is established through any one of said selectors and any one of said line switches.

8. A telephone system comprising a group of selectors, a group of line switches, a set of trunk lines common to said selectors, each of said trunk lines having a set of multiple terminals associated with said group of selectors and each of said trunk lines also having a set of multiple terminals associated with said group of line switches, and a ringer relay allotted to each of said trunk lines.

9. A telephone system comprising a group of selectors, a group of line switches, a set of trunk lines common to said selectors, each of said trunk lines having a set of multiple terminals associated with said group of selectors, and each of said trunk lines also having a set of multiple terminals associated with said group of line switches whereby a talking circuit is established through any one of said selectors and any one of said line switches, and a trunk release relay allotted to each of said trunk lines.

10. A telephone system comprising a group of selectors, a group of line switches, a set of trunk lines common to said selectors, each of said trunk lines having a set of multiple terminals associated with said group of selectors and each of said trunk lines also having a set of multiple terminals associated with said group of line switches, a ringer relay and a trunk release relay allotted to each of said trunk lines.

11. A telephone system comprising a group of selectors, a group of line switches, a set of trunk lines common to said selectors, each of said trunk lines having a set of multiple terminals associated with said group of selectors and each of said trunk lines also having a set of multiple terminals associated with said group of line switches, a ringer relay, a trunk release relay allotted to each of said trunk lines, a subscriber's line allotted to each of said line switches, means whereby any of said line switches may be caused to seize any one of said trunk lines, and the seized trunk line put in connection with the line of the seizing line switch, means whereby the ringer relay of the seized trunk line may be operated to send signaling current to the line of said line switch, and means whereby the said ringer relay and said release relay may be operated to release the said line switch.

12. In a telephone system, a trunk line, a series of switches arranged in consecutive order, means whereby the first switch of the series may be operated to establish a connection therefrom to the second switch of the series, means whereby the second switch of the series may then be operated to extend the connection to the third switch of the series, means whereby the third switch may then be operated to establish connection with said trunk line, and means whereby the fourth switch of the series may then be operated to seize and establish connection with said trunk line previously selected by said third switch, whereby the first switch of the series may be connected through to the fourth switch of the series.

13. In a telephone system, a calling and a called line, means for connecting the two having in combination, a couple of switches, trunk lines common to said switches, means whereby one of said switches may seize one of said trunk lines to extend connection in the direction of the called subscriber, and subscriber-controlled means whereby the other of said switches may then be operated via the first switch to seize the other end of the same trunk line, whereby a temporary connection may be established between the said switches.

14. A telephone system comprising a plurality of subscribers' substations, means whereby one subscriber may call another comprising a pair of switches, trunk lines common to said switches, means whereby the first switch may be operated to seize any one of said trunk lines to extend connection in the direction of the called subscriber, and means whereby the second switch may then be operated to establish connection with the other end of the same trunk line, whereby the calling and called subscribers are then connected.

15. A telephone system comprising a plurality of subscribers' substations, means whereby one subscriber may call another comprising a pair of switches, trunk lines common to said switches, means whereby the first switch may be operated to seize any one of said trunk lines, and means whereby the second switch may then be operated to establish connection with the same trunk line, comprising a trunk selecting master switch whereby the calling and called subscribers are connected.

16. In a telephone system, a group of selectors, a group of line switches, a master switch for operating said line switches, a group of trunk lines common to said selectors, means whereby any one of said selectors may be operated to select one of said trunk lines, means whereby the said master switch may then be operated to carry all of the idle line switches to a position opposite the said trunk line, and means whereby one of said operated line switches may be made to establish connection with the selected trunk line.

17. In a telephone system, the combination of a group of selectors, a group of trunk lines common to said selectors, a group of line switches, a master switch provided with selecting means common to said line switches for operating said line switches, each of the trunk lines in the aforesaid group being also common to said group of line switches, another line switch for each of the aforesaid trunk lines, said other line switches constituting a group having a common selecting means embodied in another master switch, a group of connectors common to said other line switches, any one of which connectors is adapted to be seized by any one of said other line switches, a group of subscribers' lines to which the said first mentioned line switches are allotted, private bank contacts common to said connectors, one bank for each subscriber's line, a subscriber's telephone equipment allotted to each subscriber's line, means whereby any subscriber may through the medium of one of said selectors seize one of the trunk lines common thereto, means for operating the line switch allotted to said trunk line to seize one of said connectors whereby said connector may then be operated to establish connection with the private contact of the desired line, means whereby, when connection is thus completed, the line switch of the called line connects the called line with the previously seized trunk line, and means whereby the said connector is released and restored to leave the calling and called lines temporarily connected together.

18. In a telephone system, the combination of a group of selectors, a group of trunk lines common to said selectors, a group of line switches, a master switch provided with selecting means common to said line switches for operating said line switches, each of the trunk lines of the aforesaid group being also common to said group of line switches, another line switch for each of the aforesaid trunk lines, said other line switches constituting a group provided with a common selecting means embodied in another master switch, a group of connectors common to said other line switches, any one of which connectors is adapted to be seized by any one of said other line switches, a group of subscribers' lines to which said first mentioned line switches are allotted, private bank contacts common to said connectors, one bank for each subscriber's line, subscriber's telephone equipment allotted to each subscriber's line, means whereby any subscriber may through the medium of one of said selectors seize one of the trunk lines common to said selector, means for operating the line switch allotted to said trunk line to seize one of said connectors, means whereby the said connector may then be operated to establish connection with the contact of a given subscribers' line, whereby the first mentioned master switch operates to place all of the first mentioned line switches opposite the previously selected trunk line to cause the automatic release of said connector, and to at the same time cause only the line switch of the subscriber's line selected by the said connector to connect said selected trunk line with the said line of the called subscriber.

19. In a telephone system, a trunk line, a group of subscribers' line switches, said trunk line common to said line switches, a connector provided with a contact point for every line switch, a subscriber's line allotted to each line switch, the said connector adapted to be operated from the said trunk line, and selecting means common to said line switches, adapted to cause all of the said line switches to select idle trunk lines, comprising means for then releasing the connector switch and cause only the line switch allotted to the contact seized by the said connector to operate and connect the said trunk line with the called subscriber's line.

20. In a telephone system, the combination of a group of selectors, a group of line switches, a subscriber's line for each line switch, a group of trunk lines extending from said selectors to said line switches, said trunk lines common to said selectors, also common to said line switches, a selecting means common to said line switches, a group of connector switches associated with said trunk lines, each of said connectors provided with contacts corresponding to said subscriber's lines, means whereby any one of said connectors may be operated from any one of said trunk lines to pick out any one of said subscriber's line contacts, means for at the same time causing the said selective means to operate to bring all of said line switches opposite the selected trunk line, whereby the connector is then released and the line switch of the called subscriber's line is caused to operate to place its line in connection with the trunk line and whereby the said connector cannot be released by the selecting means until connection is made with a subscriber's line contact.

21. In a telephone system, the combination of a group of trunk lines, a line switch for each trunk line, a group of connector switches common to said line switches, a master switch, means whereby any one of said line switches may be operated from its trunk line to establish connection with one of said connectors, means whereby said connector may then be operated and the said master switch automatically started as soon as the operation of the connector is completed, and whereby the said master switch upon operating automatically releases the connector switch and line switch.

22. In a telephone system, a calling and a called line, means for connecting the two having in combination a trunk line, a switch individual to said trunk line, a connector switch, means whereby the said connector switch upon establishing connection with the called line will cause the said line to be connected directly to said trunk line, and whereby the connector is then automatically released via said individual switch without disturbing the temporarily established connection between calling and called subscribers.

23. In a telephone system, a calling subscriber's line, a called subscriber's line, a connector switch adapted to be operated by the calling subscriber to obtain momentary connection with contacts allotted to the called line, and means whereby the calling subscriber is then connected directly with the called subscriber and the connector released and the connection between the calling and called subscribers maintained for talking purposes.

24. In a telephone system, a connector switch, a master switch controlled line switch common to a plurality of calling subscribers' lines, and a single release relay in the connector for closing a release circuit for the connector and for the line switch for releasing the said connector switch and line switch, as set forth.

25. In a telephone system, a line switch, a connector, a release magnet for said line switch, a trunk release conductor running between said line switch and said connector, a release magnet for said connector, a private magnet, a busy line, means whereby the said connector may be carried on to the line, a busy release circuit adapted to be automatically established when the connector attempts to close connection with the busy line whereby the said private magnet is energized and whereby in turn the release magnet of said connector is energized and the said connector released and the release magnet of said line switch energized and the line switch released.

26. In a telephone system, a line switch, a connector, a release magnet for said line switch, a release magnet for said connector, and a private magnet for said connector adapted when energized to energize the release magnets of the said connector and the said line switch for releasing the same.

27. In a telephone system, a non-numerical line switch, a connector, a release magnet for said line switch, a release magnet for said connector, a release relay for said connector, and energizing circuits for said release magnets closed by the said release relay alone, said release circuits adapted to be established when said relay is energized to cause the release of said connector and said line switch.

28. In a telephone system, a master switch, a connector switch including a side switch, and a release relay adapted to be energized, when the connector side switch passes to third position, by the master switch, whereby the connector may be released.

29. In a telephone system, the combination of a trunk line, a subscriber's line, a connector switch, a side switch therefor, a contact for said connector allotted to the said subscriber's line, a master switch, a release relay for said connector, said connector adapted to establish connection with said subscriber's line contact, an energizing circuit for said release relay controlled by said master switch and normally open at the connector switch until the side switch thereof passes to third position, means whereby when the connector engages with said contact the said master switch is started and an energizing circuit closed through said release relay by said master switch for releasing said connector, other subscriber's lines, a line switch plunger for each subscriber's line, said master switch for controlling the connector release and the line switch plungers.

30. In a telephone system, the combination of a group of subscribers' substations, a line switch for each of said subscribers, plungers for said line switches, a group of connectors for said subscribers' substations, release circuits for said connectors, and a master switch for automatically controlling said release circuits and for controlling the plungers of said line switches.

31. In a telephone system, the combination of a trunk line, a line switch for said trunk line, a connector, another line switch, the said trunk line terminating in said other line switch, means whereby the first line switch is made to connect with the said connector, means whereby said connector is made to connect with the second line switch to cause the latter to seize the trunk line, and means whereby said connector is then released.

32. In a telephone system, subscribers' telephone lines, and a pair of progressively movable individual trunking switches for each telephone line, one by which the subscriber calls and the other by which the subscriber is called.

33. In a telephone system, subscribers' lines, and subscriber-controlled automatic means for trunking calling lines into connection with called lines, said means comprising a pair of progressively movable individual trunking switches for each subscriber's line, one by which the subscriber calls and the other by which the subscriber is called.

34. In a telephone system, a calling and a called line, means for connecting the two having in combination a switch individual to the calling line, an automatic switch adapted to perform a connecting operation in accordance with the last two digits of the called number, automatic means for releasing and restoring said switch as soon as the called line is found, and automatic means controlled by the calling subscriber via said individual switch for extending a substitute or talking connection from the called line in the direction of the calling line.

35. In a telephone system, a calling and a called line, means for connecting the two having in combination a switch individual to the calling line, a subscriber-controlled automatic switch for performing a switching operation in accordance with one or more digits of the called number, automatic means for releasing and restoring said switch as soon as it has completed its operation, and automatic means controlled by the calling subscriber via said individual switch for establishing a substitute or talking connection between the calling and called subscribers.

36. In a telephone system, subscribers' telephone lines, a series of switches for automatically trunking a calling line in the direction of the called line, automatic means for cutting out one or more of said switches as soon as the called line is found, and automatic means for establishing a substitute or talking connection from the called line in the direction of the calling line.

37. In a telephone system, subscribers' telephone lines, a series of switches for automatically trunking a calling line in the direction of the called line, automatic means for cutting out one or more of said switches as soon as the called line is found, and automatic means for establishing a substitute or talking connection between the two lines.

38. In a telephone system, subscribers' lines, and a series of switches for automatically trunking a calling line in the direction of the called line, at least two of said switches being numerical switches for switching in accordance with one or more digits of the called number, and another of said switches being a non-numerical trunking switch located between the two numerical switches.

39. In a telephone system, subscribers' lines, means including a selector and a connector for automatically extending connection from a calling line in the direction of the called line, and a non-numerical trunking switch intermediate of the selector and connector.

40. In a telephone system, subscribers' lines, a pair of individual trunking switches for each subscriber's line, and means by which a calling subscriber initiates the operation of one of his individual switches and the non-corresponding individual switch of the called line to automatically establish connection between the two lines.

41. In a telephone system, a calling telephone line, a called telephone line, an individual trunking switch for the calling line, an individual trunking switch for the called line, one or more switches intermediate said individual switches, and means by which the calling subscriber initiates the operation of both of said individual switches to establish a talking connection between the two lines.

42. In a telephone system, a set of trunk lines, means including an automatic switch for extending connection to said trunk lines, automatic means for extending connection from the other ends of said trunk lines, said automatic means comprising non-numerical trunking switches, one switch for each trunk line, each switch adapted to perform a trunking operation without reference to the called number, and automatic switches for the trunks leading from said non-numerical switches.

43. In a telephone system, a trunk line, means for extending connection to said trunk line, a non-numerical trunking switch for the other end of said trunk line, said switch adapted to perform an automatic trunking operation without reference to the called number, automatic means for cutting out and restoring said non-numerical switch as soon as the called line is found, and automatic means for establishing a substitute or talking connection between the two subscribers' lines.

44. In a telephone system, a trunk line, automatic means for connecting a calling subscriber with said trunk line, automatic means for extending connection from the other end of said trunk line in the direction of the called subscriber, said last-mentioned automatic means including a non-numerical trunking switch for said trunk line, adapted to perform an automatic trunking operation without reference to the called number, automatic means for cutting out and restoring said non-numerical switch as soon as the called line is found, and automatic means for establishing a substitute or talking connection between the two subscribers' lines.

45. In a telephone system, a group of subscribers' lines, a pair of individual trunking switches for each subscriber's line, one by which the subscriber calls and the other by which the subscriber is called, a master switch for the individual switches by which the subscribers call, and another master switch for the individual switches by which the subscribers are called.

46. A telephone system comprising subscribers' lines, individual trunking switches for said lines, each switch adapted for use only when its allotted line is called, and trunk lines having multiple terminals in said individual switches, together with means whereby any calling subscriber may initiate the operation of the individual switch of the called line to complete the connection between the two lines.

47. In a telephone system, a calling and a called line, means for connecting the two having in combination a switch individual to the calling line and automatic switching means for extending connection in the direction of the called subscriber, automatic means for releasing and restoring said switching means as soon as the called subscriber is found, and automatic means controlled by the calling subscriber via said individual switch for then establishing a substitute or talking connection between the two subscribers.

48. A telephone system comprising means for automatically trunking calling subscribers' line into connection with the lines of the called subscribers, said means including individual switches for the different subscribers' lines, and automatic means controlled by the calling subscriber via his individual switch by which the individual switch of any called subscriber is operated to complete the trunking connection thereto.

49. A telephone system comprising subscribers' lines, individual trunking switches for said lines, suitable means for extending connection from any calling line to the individual switch of the called line, and calling subscriber controlled automatic means for causing the operation of the individual switch of the called line to complete the connection thereto.

50. A telephone system comprising subscribers' lines, an individual switch for each line, means for extending connection from any calling line to the individual switch of the called line, said individual switch provided with means controlled by the calling subscriber via his individual switch for automatically completing the connection to the called line.

51. In a telephone system, a calling subscriber's line, a called subscriber's line, switching means individual and common to the subscribers for extending connection from the calling line to the called line, automatic means for cutting out and restoring all common switching means as soon as the called subscriber's line is found, and automatic means for establishing a substitute connection in place of the switching means thus cut out and restored, leaving the two subscribers' lines connected only through the medium of individual switches.

52. In a telephone system, a calling line, a called line, numerical and non-numerical trunking means for extending connection from the calling line to the called line, said trunking means being exclusively automatic, automatic means for cutting out and restoring the numerical switching means as soon as the called line is found and for establishing a substitute connection in place of the numerical switching means thus cut out and restored to normal condition, leaving the two lines connected only through the medium of non-numerical switching means.

53. In a telephone system, a calling subscriber's line, a called subscriber's line, individual trunking switches for said lines, switching means for extending connection from the calling subscriber's individual switch to the called subscriber's line, automatic means for cutting out and restoring said switching means as soon as the called subscriber's line is found, and automatic means for establishing a substitute connection in place of the means thus cut out, leaving the two lines connected only through the medium of the subscribers' individual switches.

54. In a telephone system, a calling subscriber's line, a called subscriber's line, intermediate connecting apparatus, an automatic switch individual to the calling subscriber for extending connection to the said apparatus, automatic means for cutting out and restoring said apparatus as soon as the called line is found, an individual switch or the called line, and automatic means for operating said last-mentioned individual switch to establish a substitute connection in place of the apparatus thus cut out, leaving the two lines connected only through the medium of said individual switches.

55. In a telephone system, the combination of subscriber's lines, switching means common to the subscribers for use in extending connection from calling lines to called lines, switching devices individual to the subscriber's lines, automatic means for cutting out all of said switching means as soon as the called lines are found, and automatic means for establishing substitute connections in place of the automatic means thus cut out, leaving the calling and called lines connected only through the medium of the individual switching devices.

56. In a telephone system, the combination of subscriber's lines, switching devices individual and common to the different subscriber's lines, automatic means for cutting out and restoring all common switching devices as soon as the called subscribers' lines are found, and automatic means for establishing substitute connections in place of the means thus cut out, leaving only individual switching devices in the connections between calling and called lines.

57. In a telephone system, the combination of subscribers' lines, automatic switching devices individual and common to the different subscribers' lines, automatic means for cutting out all common switching devices as soon as the called lines are found, and automatic means for establishing substitute connections in place of the devices thus cut out, leaving only the automatic individual switching devices in the connections between calling and called lines.

58. In a telephone system, subscribers' lines, exclusively automatic trunking means comprising in combination, a trunk line for use in extending connection to a called subscriber's line, automatic means for cutting out said trunk line as soon as the called subscriber's line is found, and automatic means for establishing a substitute connection in place of said trunk line, to restore said trunk line to a condition for use by other subscribers.

59. In a telephone system, the combination of subscribers' lines, exclusively automatic trunking means for use in extending connection from calling lines to called lines, subscriber controlled means for establishing substitute connections for talking purposes as soon as the called lines are found, and means for restoring said automatic means.

60. In a telephone system, the combination of subscribers' lines, subscriber-controlled means for finding the called subscribers' lines, automatic means for cutting out and restoring said finding means as soon as the called subscribers' lines are found, and automatic means for then establishing substitute or talking connections in place of the means thus cut out.

61. In a telephone system, subscribers' telephone lines, a pair of individual trunking switches for each telephone line, one by which the subscriber calls and the other by which the subscriber is called, and means having vertical motion to select a group or division of the exchange and rotary motion to connect with a line therein.

62. In a telephone system, subscribers' lines subscriber-controlled automatic means for trunking calling lines into connection with called lines, said means comprising a pair of individual trunking switches for each subscriber's line, one by which the subscriber calls and the other by which the subscriber is called, and means having vertical motion to select a group or division of the exchange and rotary motion to connect with a line therein.

63. In a telephone system, a calling and a called line, means for connecting the two having in combination a switch individual to the calling line, an automatic switch controlled by the calling subscriber via said individual switch and adapted to perform a connecting operation in accordance with the last two digits of the called number, having vertical motion to select a group and rotary motion to connect with a line therein, automatic means for releasing and restoring said automatic switch as soon as the called line is found, and automatic means for extending a substitute or talking connection from the called line in the direction of the calling line.

64. In a telephone system, a subscriber-controlled automatic switch for performing a switching operation in accordance with one or more digits of the called number, having vertical motion to select a group and rotary motion to connect with a line therein, automatic means for releasing and restoring said switch as soon as it has completed its operation, and automatic means for establishing a substitute or talking connection between the calling and called subscribers.

65. In a telephone system, subscribers' telephone lines, a series of switches for automatically trunking a calling line in the direction of the called line, some of said switches having vertical motion to select a group and rotary motion to connect with a line therein, automatic means for cutting out one or more of said switches as soon as the called line is found, and automatic means for establishing a substitute or talking connection from the called line in the direction of the calling line.

66. In a telephone system, subscribers' telephone lines, a series of switches for automatically trunking a calling line in the direction of the called line, some of said switches having vertical motion to select a group and rotary motion to connect with a line therein, automatic means for cutting out one or more of said switches as soon as the called line is found, and automatic means for establishing a substitute or talking connection between the two lines.

67. In a telephone system, subscribers' lines, and a series of switches for automatically trunking a calling line in the direction of the called line, at least two of said switches being numerical switches for switching in accordance with one or more digits of the called number, and having vertical motion to select a group and rotary motion to connect with a line therein, and another of said switches being a non-numerical switch located between the two numerical switches.

68. In a telephone system, subscribers' lines, means including a selector and a connector for automatically extending connection from a calling line in the direction of the called line, having vertical motion to select a group and rotary motion to connect with a line therein, and a non-numerical trunking switch intermediate of the selector and connector.

69. In a telephone system, subscribers' lines, a pair of individual trunking switches for each subscriber's line, means by which a calling subscriber initiates the operation of one of his individual switches and the non-corresponding individual switch of the called line to automatically establish connection between the two lines, and first-selectors having vertical motion to select a group and rotary motion to connect with a line therein, as set forth.

70. In a telephone system, a calling telephone line, a called telephone line, an individual trunking switch for the calling line, an individual trunking switch for the called line, means by which the calling subscriber initiates the operation of both of said individual switches to establish a talking connection between the two lines, and first-selectors having vertical motion to select a group and rotary motion to connect with a line therein, as set forth.

71. In a telephone system, a set of trunk lines, means for extending connection to said trunk lines, automatic means for extending connection from the other ends of said trunk lines, said automatic means comprising non-numerical trunking switches, one switch for each trunk line, each switch adapted to perform a trunking operation without reference to the called number, and switches having vertical motion to select a group and rotary motion to connect with the called line therein, said switches having each a release circuit which is automatically closed as soon as the called line is found.

72. In a telephone system, a trunk line, automatic means for extending connection to said trunk line, a calling subscriber controlled non-numerical trunking switch for the other end of said trunk line, said switch adapted to perform an automatic trunking operation without reference to the called number, and switches having vertical motion to select a group and rotary motion to connect with the called line therein, said switches having each a release circuit which is automatically closed as soon as the called line is found.

73. In a telephone system, a trunk line, automatic means for connecting a calling subscriber with said trunk line, automatic means for extending connection from the other end of said trunk line in the direction of the called subscriber, said last-mentioned automatic means including a non-numerical trunking switch for said trunk line, adapted to perform an automatic trunking operation without reference to the called number, and switches having vertical motion to select a group and rotary motion to connect with the called line therein, said switches having each a release circuit which is automatically closed as soon as the called line is found.

74. In a telephone system, the combination of the following mentioned elements, to-wit: a group of subscribers' lines, a pair of individual trunking switches for each subscribers' line, one by which the subscriber calls and the other by which the subscriber is called, a master switch for the individual switches by which the subscribers call, another master switch for the individual switches by which the subscribers are called, and means having vertical motion to select a group and rotary motion to find the called line therein.

75. In a telephone system, the combination of the following mentioned elements, to-wit: subscribers' lines, individual trunking switches for said lines, each switch adapted for use only when its allotted line is called, trunk lines having multiple terminals in said individual switches, means having vertical motion to select a group and rotary motion to find the called line therein, and means whereby any calling subscriber may initiate the operation of the individual switch of the called line to complete the connection between the two lines.

76. A telephone system comprising exclusively automatic trunking means for automatically trunking calling subscribers' lines into connection with the lines of the called subscribers, said means including individual switches for the different subscribers' lines, means having vertical motion to select a group and rotary motion to connect with the called line therein, and calling subscriber controlled automatic means by which the individual switch of any called subscriber is operated to complete the trunking connection thereto.

77. In a telephone system, a calling subscriber's line, a called subscriber's line, switching means individual and common to the subscribers for extending connection from the calling line to the called line, said common switching means having vertical motion to select a group and rotary motion to connect with the called line therein, automatic means for cutting out and restoring all common switching means as soon as the called subscriber's line is found, and automatic means for establishing a substitute connection in place of the switching means thus cut out and restored, leaving the two subscribers' lines connected only through the medium of individual switches.

78. In a telephone system, a calling subscriber's line, a called subscriber's line, exclusively automatic trunking means comprising calling subscriber controlled numerical and non-numerical switching means for extending connection from the calling line to the called line, said numerical switching means having vertical motion to select a group and rotary motion to connect with the called line therein, automatic means for cutting out and restoring all numerical switching means as soon as the called line is found, and automatic means for then establishing a substitute connection in place of the numerical switching means thus cut out and restored to normal condition, leaving the two lines connected only through the medium of non-numerical switching means.

79. In a telephone system, a calling subscriber's line, a called subscriber's line, individual trunking switches for said lines, switching means for extending connection from the calling subscriber's individual switch to the called subscriber's line, having vertical motion to select a group and rotary motion to connect with the called line therein, automatic means for cutting out and restoring said switching means as soon as the called subscriber's line is found, and automatic means for establishing a substitute connection in place of the means thus cut out, leaving the two lines connected only through the medium of the subscriber's individual switches.

80. In a telephone system, a calling subscriber's line, a called subscriber's line, intermediate connecting apparatus having vertical motion to select a group and rotary motion to connect with the called line therein, an automatic switch individual to the calling subscriber for extending connection to the said apparatus, automatic means for cutting out and restoring said apparatus as soon as the called line is found, an individual switch for the called line, and automatic means for operating said last-mentioned individual switch to establish a substitute connection in place of the apparatus thus cut out, leaving the two lines connected only through the medium of said individual switches.

81. In a telephone system, the combination of subscribers' lines, switching means common to the subscribers for use in extending connection from calling lines to called lines, having vertical motion to select a group and rotary motion to connect with the called line therein, switching devices individual to the subscribers' lines, automatic means for cutting out all of said switching means as soon as the called lines are found, and automatic means for establishing substitute connections in place of the automatic means thus cut out, leaving the calling and called lines connected only through the medium of the individual switching devices.

82. In a telephone system, the combination of subscribers' lines, automatic switching devices individual and common to the different subscribers' lines, said common switching means having vertical motion to select a group and rotary motion to connect with the called line therein, automatic means for cutting out all common switching devices as soon as the called lines are found, and automatic means for establishing substitute connections in place of the devices thus cut out, leaving only the automatic individual switching devices in the connections between calling and called lines.

83. In a telephone system, the combination of subscribers' lines, subscriber-controlled means for finding the called subscribers' lines, having vertical motion to select a group and rotary motion to connect with the called line therein, automatic means for cutting out and restoring said finding means as soon as the called subscribers' lines are found, and automatic means for then establishing substitute or talking connections in place of the means thus cut out.

84. In a telephone system, a subscriber-controlled automatic switch having vertical and rotary motion for selecting a group and then finding the called line therein, and automatic means for restoring said switch to normal as soon as the called line is found, if the same is not busy.

85. In a telephone system, the combination of the following mentioned elements, to-wit:—a subscriber - controlled automatic switch having vertical and rotary motion for selecting a group and then finding the called line therein, another switch, and automatic means for substituting one switch for the other as soon as the called line is found.

86. In a telephone system, the combination of exclusively automatic trunking means for extending connection from a calling to a called subscriber's line including mechanism for automatically selecting idle trunks for the calling subscribers, and mechanism for selecting idle trunks for the called subscribers, said connection including said selected trunks.

87. In a telephone system, the combination of mechanism for selecting an idle trunk for the calling subscriber, mechanism for seizing a preselected trunk when the subscriber calls, mechanism for selecting an idle trunk for the called subscriber, and mechanism for seizing the preselected idle trunk when the called subscriber is found.

88. In a telephone system, the combination of mechanism for selecting idle trunks ahead of the calls, mechanism for seizing the preselected idle trunks for calling subscribers, mechanism having one motion to select groups and another motion to find the called line in the predetermined group, mechanism for selecting trunks ahead of the calls for the called subscribers, and mechanism for seizing the preselected trunks when the called lines are found.

89. In a telephone system, having calling and called subscribers' lines, the combination of an individual switch for each line and mechanism controlled by the calling subscriber via his individual switch, said mechanism having first motion in one direction to find a predetermined group, and then motion in another direction to find the called line in the selected group, and a switch automatically operative to establish a talking connection as soon as the called line is found, together with means for automatically releasing the said mechanism when the talking connection is established.

90. In a telephone system, the combination of means for extending connection from a calling to a called subscriber's line including means for selecting a trunk before the call is initiated, and mechanism for extending connection from the called line to a preselected trunk line to establish a talking connection.

91. In a telephone system, a calling line, a called line, automatic equipment for connecting the two comprising in combination a plurality of trunk lines, a plurality of progressively movable trunking switches having access to said trunks for building a connection toward the called lines, and a plurality of progressively movable trunking switches one for each called line having access in common to said trunk lines for completing the connection between the calling and the called lines.

92. In a telephone system, a calling line, a called line, automatic equipment for connecting the two comprising in combination a plurality of trunk lines, a plurality of progressively movable trunking switches having access to said trunks for building a connection toward the called lines, a plurality of progressively movable trunking switches one for each called line having access in common to said trunk lines for completing the connection between the calling and the called lines, and an automatic progressively movable switch for locating the switch of the called line, and a releasing circuit for said last switch controlled by the switch of the called line.

93. In a telephone system, a calling telephone line, a called telephone line, an individual trunking switch for the calling line, an individual trunking switch for the called line, a set of terminals for the called individual switch, one or more switches intermediate said individual switches, and means by which the calling subscriber initiates the operation of both the said individual switches to establish a talking connection between the two lines through either one or another of said terminals.

Signed by me at Chicago, Cook county, Illinois, this 7th day of May, 1907.

ALEXANDER E. KEITH.

Witnesses:
ARTHUR B. SPERRY,
J. NORBY.